United States Patent
Jaegal et al.

(10) Patent No.: US 10,214,145 B2
(45) Date of Patent: Feb. 26, 2019

(54) VEHICLE CONTROL DEVICE AND VEHICLE CONTROL METHOD THEREOF

(71) Applicant: LG ELECTRONICS INC., Seoul (KR)

(72) Inventors: Chan Jaegal, Seoul (KR); Sukjin Chang, Seoul (KR); Minjae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 341 days.

(21) Appl. No.: 14/950,690

(22) Filed: Nov. 24, 2015

(65) Prior Publication Data
US 2017/0021768 A1    Jan. 26, 2017

(30) Foreign Application Priority Data
Jul. 22, 2015 (KR) .................... 10-2015-0103856

(51) Int. Cl.
*B60Q 9/00* (2006.01)
*B60Q 5/00* (2006.01)
(Continued)

(52) U.S. Cl.
CPC ............. *B60Q 9/008* (2013.01); *B60K 35/00* (2013.01); *B60K 37/06* (2013.01); *B60Q 1/525* (2013.01);
(Continued)

(58) Field of Classification Search
CPC ........ B60Q 9/008; B60Q 5/005; B60Q 5/006; B60Q 5/008; B60R 1/00; B60R 11/0247;
(Continued)

(56) References Cited

U.S. PATENT DOCUMENTS 5,917,920 A    6/1999  Humphries
9,800,983 B2 * 10/2017  Wacquant .............. H04R 3/005
(Continued)

FOREIGN PATENT DOCUMENTS

DE    19749372 A1    5/1999
DE    20113945 U1    11/2001
(Continued)

OTHER PUBLICATIONS

Audi AG: "Audi Q3 Quick Reference Guide," XP055262029, May 1, 2012, 9 pgs.

*Primary Examiner* — Anner N Holder
*Assistant Examiner* — Hesham K Abouzahra
(74) *Attorney, Agent, or Firm* — Birch, Stewart, Kolasch & Birch, LLP

(57) ABSTRACT

A vehicle control device including a camera configured to photograph an image around a vehicle; a display unit configured to display the image received from the camera; at least one sound sensor arranged on the vehicle and configured to sense a sound generated inside or outside the vehicle; at least one sound output unit arranged on the vehicle and configured to output sound inside or outside the vehicle; and a controller configured to sense a situation of the vehicle based on the sensed sound generated inside or outside the vehicle, and control at least one of the sound sensor, sound output unit and the display unit to output information based on the sensed situation of the vehicle.

19 Claims, 21 Drawing Sheets

(51) Int. Cl.

| | |
|---|---|
| *B60R 1/00* | (2006.01) |
| *B60R 11/02* | (2006.01) |
| *H04M 9/00* | (2006.01) |
| *H04M 11/00* | (2006.01) |
| *H04M 19/04* | (2006.01) |
| *G06F 3/16* | (2006.01) |
| *H04R 1/32* | (2006.01) |
| *B60W 50/14* | (2012.01) |
| *B60K 35/00* | (2006.01) |
| *B60K 37/06* | (2006.01) |
| *B60Q 1/52* | (2006.01) |
| *B60R 11/00* | (2006.01) |

(52) U.S. Cl.
CPC ............... *B60Q 5/006* (2013.01); *B60R 1/00* (2013.01); *B60R 11/0247* (2013.01); *B60W 50/14* (2013.01); *G06F 3/165* (2013.01); *H04M 9/001* (2013.01); *H04M 11/00* (2013.01); *H04M 19/04* (2013.01); *H04R 1/323* (2013.01); *H04R 1/326* (2013.01); *B60K 2350/1028* (2013.01); *B60K 2350/1044* (2013.01); *B60R 2011/004* (2013.01); *B60R 2300/207* (2013.01); *B60R 2300/307* (2013.01); *B60R 2300/607* (2013.01); *B60R 2300/70* (2013.01); *B60R 2300/8033* (2013.01); *B60W 2050/143* (2013.01); *B60W 2050/146* (2013.01); *B60W 2420/54* (2013.01); *B60W 2422/95* (2013.01); *H04R 2499/13* (2013.01)

(58) Field of Classification Search
CPC ....... B60W 50/14; G06F 3/165; H04M 9/001; H04M 11/00; H04M 19/04; H04R 1/323; H04R 1/326
See application file for complete search history.

(56) References Cited

U.S. PATENT DOCUMENTS

| | | | |
|---|---|---|---|
| 2008/0273715 A1* | 11/2008 | Snider | B60R 1/12 |
| | | | 381/86 |
| 2010/0085171 A1 | 4/2010 | Do | |
| 2011/0199199 A1 | 8/2011 | Perkins | |
| 2012/0235852 A1* | 9/2012 | Hattori | G01S 15/10 |
| | | | 342/70 |
| 2013/0188794 A1* | 7/2013 | Kawamata | G01S 3/803 |
| | | | 381/56 |
| 2013/0223643 A1* | 8/2013 | Sato | G08B 3/10 |
| | | | 381/86 |
| 2013/0261887 A1 | 10/2013 | Raz et al. | |
| 2016/0167648 A1* | 6/2016 | James | B60Q 1/503 |
| | | | 701/28 |
| 2016/0355125 A1* | 12/2016 | Herbert | B60K 35/00 |

FOREIGN PATENT DOCUMENTS

| | | |
|---|---|---|
| DE | 10318294 A1 | 11/2004 |
| DE | 102010056174 A1 | 6/2012 |
| DE | 102012016819 A1 | 2/2014 |
| DE | 102013213039 A1 | 1/2015 |
| EP | 2763403 A1 | 8/2014 |
| JP | 6-344839 A | 12/1994 |
| JP | 7-17650 U | 3/1995 |
| JP | 2000-118260 A | 4/2000 |
| JP | 2006-298245 A | 11/2006 |
| JP | 2013-256249 A | 12/2013 |
| KR | 10-1519255 B1 | 5/2015 |

* cited by examiner

VEHICLE CONTROL DEVICE AND VEHICLE CONTROL METHOD THEREOF

CROSS-REFERENCE TO RELATED APPLICATIONS

Pursuant to 35 U.S.C. § 119(a), this application claims the benefit of earlier filing date and right of priority to Korean Application No. 10-2015-0103856, filed on Jul. 22, 2015, the contents of which is incorporated by reference herein in its entirety.

BACKGROUND OF THE INVENTION

1. Field of the Invention

The present disclosure relates to a vehicle control device and a vehicle control method thereof, which can control a vehicle by using sound information.

2. Description of the Conventional Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players.

Meanwhile, with the development of electronic technologies, automation technologies of vehicles have been considerably developed. Also, various functions for assisting driver's driving have been developed together with the development of the electronic technologies. These technologies are generally called as an advanced driver assistance system (ADAS).

In order to assist driving of a vehicle, various sensors have been developed in the vehicle field, and a technique of recognizing situation information around a vehicle through these sensors has been developed. However, these sensors are limited to sensing of visual information through a camera, etc. Therefore, the present disclosure proposes a method of providing functions which assist driving of a vehicle by using auditory information sensed through a sound sensor.

SUMMARY OF THE INVENTION

Therefore, an aspect of the detailed description is to detect situation information around a vehicle, based on sound information.

Another aspect of the detailed description is to provide a method in which a driver inside a vehicle has a conversation with a pedestrian outside the vehicle without opening a window.

Still another aspect of the detailed description is to provide various multimedia functions, based on sound information.

To achieve these and other advantages and in accordance with the purpose of this specification, as embodied and broadly described herein, a vehicle control device includes: a camera configured to photograph an image around a vehicle; a display unit configured to display the image received from the camera; a sound sensor configured to sense a sound generated inside or outside the vehicle; a sound output unit configured to output the sound generated inside or outside the vehicle; and a controller configured to activate at least one of the display unit, the sound sensor, and the sound output unit such that a function related to the sound, based on sound information corresponding to the sound sensed by the sound sensor.

To achieve these and other advantages and in accordance with the purpose of this specification, as embodied and broadly described herein, a vehicle control method of a vehicle control device, includes: sensing a sound generated inside or outside a vehicle; detecting situation information related to the vehicle, based on sound information corresponding to the generated sound; and performing at least one function related to the situation information related to the vehicle.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized. A vehicle in the present invention may be a vehicle to sense information related to environments around the vehicle, and to execute an electronic control.

Figure 1A:
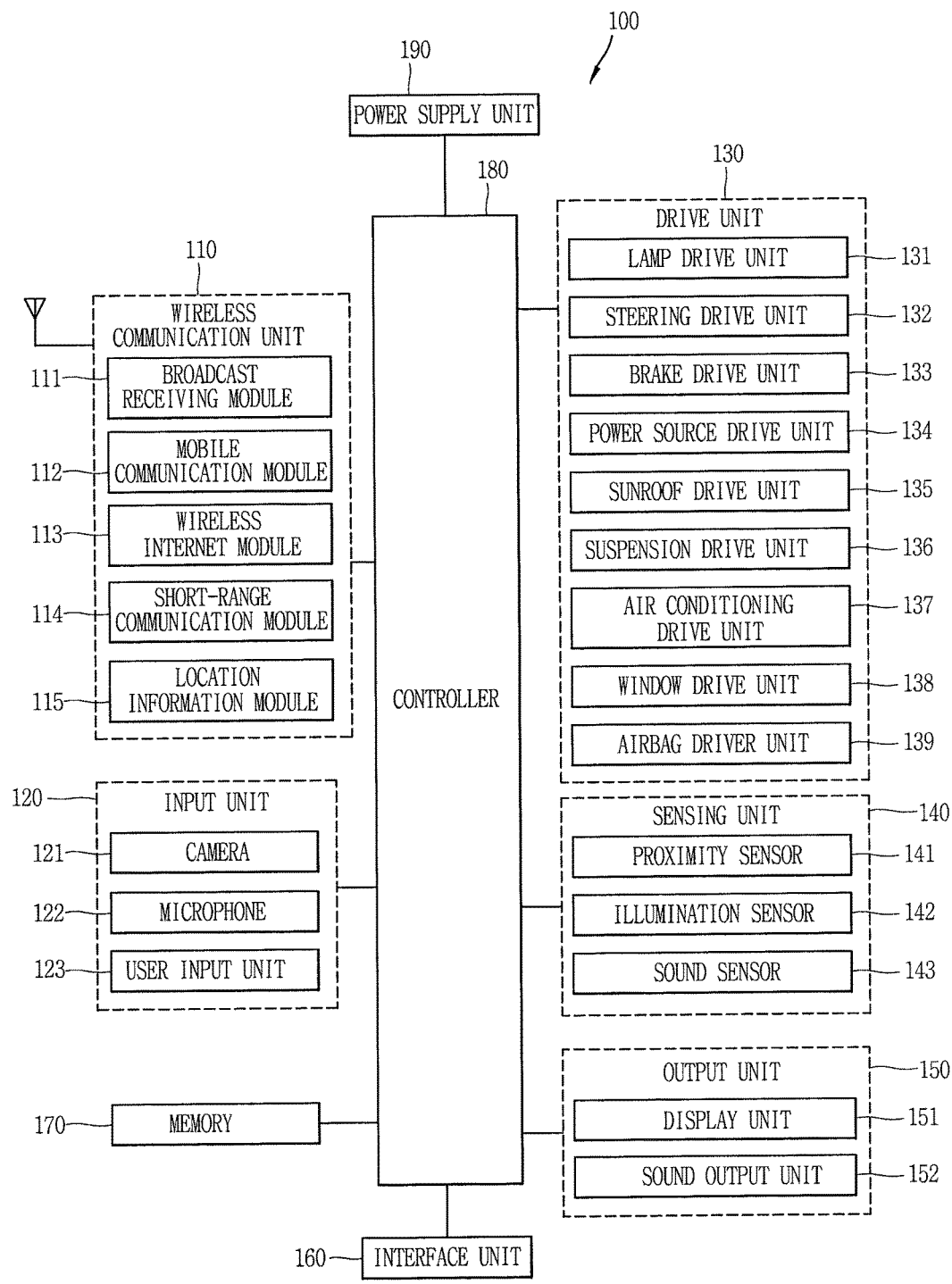
FIG. 1A is a block diagram illustrating a vehicle control device according to an exemplary embodiment.

FIG. 1A is a block diagram illustrating a vehicle control device according to an exemplary embodiment. The vehicle control device 100 may include a wireless communication unit 110, an input unit 120, a drive unit 130, a sensing unit 140, an output unit 150, an interface unit 160, a memory 170, a controller 180, a power supply unit 190, and the like. Implementing all of the illustrated components is not a requirement, and that greater or fewer components may alternatively be implemented.

Referring now to FIG. 1A, the vehicle control device 100 is shown having wireless communication unit 110 configured with several commonly implemented components. For instance, the wireless communication unit 110 typically includes one or more components which permit wireless communication between the vehicle control device 100 and a wireless communication system or network within which the mobile terminal is located.

The wireless communication unit 110 typically includes one or more modules which permit communications such as wireless communications between the vehicle control device 100 and a wireless communication system, communications between the vehicle control device 100 and another mobile terminal, communications between the vehicle control device 100 and an external server. Further, the wireless communication unit 110 typically includes one or more modules which connect the vehicle control device 100 to one or more networks. To facilitate such communications, the wireless communication unit 110 includes one or more of a broadcast receiving module 111, a mobile communication module 112, a wireless Internet module 113, a short-range communication module 114, and a location information module 115.

The wireless communication unit 110 may exchange data with a mobile terminal or a server in a wireless manner. The wireless communication unit 110 may wirelessly exchange data with a mobile terminal of a vehicle driver. The wireless manner may include Bluetooth, Wi-Fi Direct, Wi-Fi, APix, NFC, etc. The wireless communication unit 110 may receive, from a mobile terminal or a server, weather information, or information a traffic situation on a road, e.g., a transport protocol expert group (TPEG) information.

When a user boards a vehicle, a mobile terminal of the user and the vehicle control device 100 may execute pairing through the short-range communication module 114, automatically or according to a user's request. The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The drive unit 130 may control overall components constituting a vehicle. The drive unit 130 may include a lamp drive unit 131, a steering drive unit 132, a brake drive unit 133, a power source drive unit 134, a sunroof drive unit 135, a suspension drive unit 136, an air conditioning drive unit 137, a window drive unit 138, an airbag drive unit 139, and the like.

The lamp drive unit 131 may control turn-on/turn-off of lamps disposed inside or outside the vehicle. Also, the lamp drive unit 131 may control the intensity, direction, etc. of light emitted from a lamp. For example, the lamp drive unit 131 may turn on or turn off a direction indicator lamp, a brake lamp, etc., provided in the vehicle.

The steering drive unit 132 may perform electronic control of a steering apparatus in the vehicle. The steering apparatus may be a user input unit provided in the vehicle to control a movement of a main body of the vehicle. For example, the steering apparatus may become a handle or steering wheel. The steering apparatus may control the moving direction of the main body of the vehicle based on a user input. For example, as the user turns the steering wheel to the right, the steering apparatus may control the vehicle such that the advancing direction of the vehicle faces the right.

The brake drive unit 133 may perform electronic control of a brake equipment in the vehicle. The brake equipment is a component provided to brake the vehicle. The brake equipment may brake the movement of the vehicle by transmitting braking power to wheels and other apparatuses. The brake equipment may include a hand brake, an air brake, an electric brake, etc., based on power for generating the braking power.

The brake drive unit 133 may control the brake equipment such that the braking power generated by the brake equipment is transmitted to the wheels and the other apparatuses. As an example, the brake drive unit 133 may reduce the speed of the vehicle by controlling the movement of a brake disposed at the wheel. As another example, the brake drive unit 133 may control the advancing direction of the vehicle to the left or right by allowing brakes respectively disposed at left and right wheels to operate differently.

The power source drive unit 134 may perform electronic control of a power source in the vehicle. As an example, when a fossil fuel based engine is used as the power source, the power source drive unit 134 may perform electronic control of the engine. Accordingly, the power source drive unit 134 can control the output torque, etc. of the engine. As another example, when an electric-based motor is used as the power source, the power source drive unit 134 may perform control of the motor. Accordingly, the power source drive unit 134 can control the rotating speed, torque, etc. of the motor.

The sunroof drive unit 135 may perform electronic control of a sunroof apparatus in the vehicle. For example, the sunroof drive unit 135 may control the opening or closing of a sunroof of the vehicle. The suspension drive unit 136 may perform electronic control of a suspension apparatus in the vehicle. For example, when unevenness exists on a road surface, the suspension drive unit 136 may control the suspension apparatus such that vibration of the vehicle is reduced.

The air conditioning drive unit 137 may perform electronic control of an air conditioner in the vehicle. For example, when the temperature inside the vehicle is high, the air conditioning drive unit 137 may control the air conditioner such that cool air is supplied into the vehicle. The window drive unit 138 may perform electronic control of a window apparatus in the vehicle. For example, the window drive unit 138 may control the opening or closing of left and right windows disposed at sides of the vehicle.

The airbag drive unit 139 may perform electronic control of an airbag apparatus in the vehicle. For example, the airbag drive unit 139 may control the airbag apparatus such that when an accident of the vehicle is sensed, an airbag is blown out.

The sensing unit 140 may include one or more sensors for at least one of in-vehicle information, ambient environment information surrounding the vehicle, and user information. For example, the sensing unit 140 may include at least one of a proximity sensor 141, an illumination sensor 142, a sound sensor 143, a heading sensor, a yaw sensor, a vehicle forward/backward sensor, a wheel sensor, a vehicle speed sensor, a touch sensor, an acceleration sensor, a magnetic sensor, a gravity (G)-sensor, a gyroscope sensor, a motion sensor, an RGB sensor, an infrared (IR) sensor, a finger scan sensor, an ultrasonic sensor, an optical sensor, e.g., a camera (see 121), a microphone (see 122), a battery gauge, an environmental sensor (e.g., a barometer, a hygrometer, a thermometer, a radioactivity sensor, a thermal sensor, a gas sensor, etc.), a chemical sensor (e.g., an electronic nose, a health care sensor, a biometric sensor, etc.), a vehicle body inclination sensor, a battery sensor, a fuel sensor, a tire sensor, and a steering sensor for sensing a rotation degree of the steering wheel. Meanwhile, the vehicle disclosed in this specification may use a combination of information sensed by at least two of these sensors.

In addition, the sensing unit 140 may further include an accelerator pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), etc. The sound sensor 143 may be a component of the microphone 122, or may be provided independently from the microphone 122. The sound sensor are may be formed to sense an audio signal. The audio signal may be a sound generated outside or inside the vehicle. The vehicle disclosed in this specification may use information corresponding to the audio signal sensed by the sound sensor 143.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the vehicle control device 100 and a user, as well as function as the user input unit 123 which provides an input interface between the vehicle control device 100 and the user.

The display unit 151 may include a cluster or a head up display (HUD) at the front inside the vehicle. Meanwhile, when the display unit 151 is the HUD, the display unit 151 may include a projection module for projecting images onto a front glass of the vehicle control device 100.

The interface unit 160 serves as an interface with various types of external devices that can be coupled to the vehicle control device 100. The interface unit 160, for example, may include any of a vehicle ECU 270, a vehicle sensor 260, wired or wireless ports, external power supply ports, wired or wireless data ports, memory card ports, ports for connecting a device having an identification module, audio input/output (I/O) ports, video I/O ports, earphone ports, and the like. In some cases, the vehicle control device 100 may perform assorted control functions associated with a connected external device, in response to the external device being connected to the interface unit 160.

The memory 170 is typically implemented to store data to support various functions or features of the vehicle control device 100. For instance, the memory 170 may be configured to store application programs executed in the vehicle control device 100, data or instructions for operations of the vehicle control device 100, and the like. Some of these application programs may be downloaded from an external server via wireless communication. Other application programs may be installed within the vehicle control device 100 at time of manufacturing or shipping, which is typically the case for basic functions of the vehicle control device 100 (for example, a road guidance function, a vehicle control function, etc.). It is common for application programs to be stored in the memory 170, installed in the vehicle control device 100, and executed by the controller 180 to perform an operation (or function) for the vehicle control device 100.

The controller 180 typically functions to control overall operation of the vehicle control device 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170. The controller 180 can be understood as a component executing the same function or a similar function as or to a vehicle electronic control unit (ECU).

The power supply unit 190 can be configured to receive external power or provide internal power in order to supply appropriate power required for operating elements and components included in the vehicle control device 100. The power supply unit 190 may include a battery, and the battery may be configured to be embedded in the terminal body, or configured to be detachable from the terminal body.

Figure 1B:
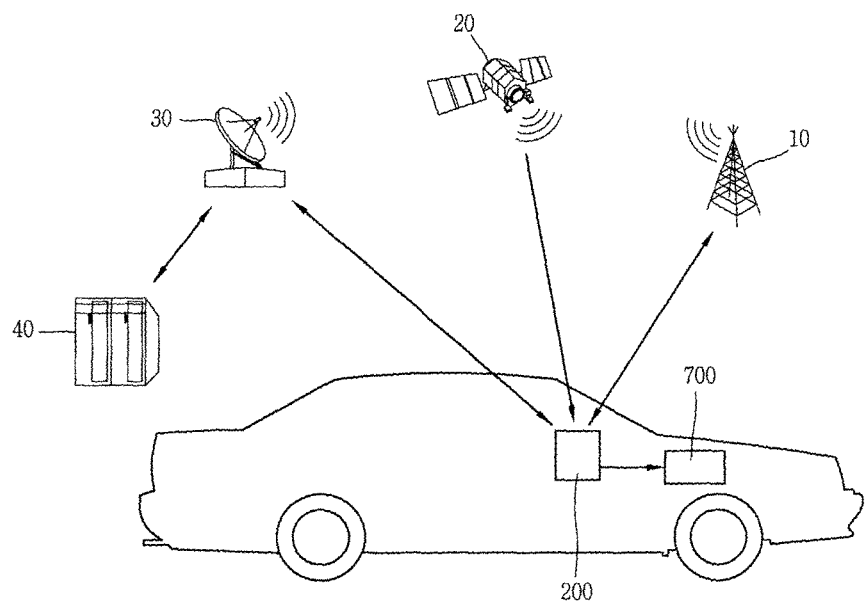
FIG. 1B is a conceptual diagram illustrating a telematics terminal system according to an exemplary embodiment.

FIG. 1B is a block diagram illustrating a telematics terminal system having a communication terminal according to an exemplary embodiment disclosed in this specification. As shown in FIG. 1B, a vehicle telematics terminal system may include an information providing center 40 for providing traffic information and various data (for example, programs, execution files, etc.), and a telematics terminal 200 mounted in the vehicle for receiving traffic information via a remote wireless communication network 30 and/or a short-range wireless communication network, and providing a road guidance service based upon a GPS signal received via a satellite 20 and the traffic information. Here, examples of the communication network may further include a wired/wireless communication networks, such as a Local Area Network (LAN), a Wide Area Network (WAN) and the like.

Various traffic information (for example, road traffic information or interesting area information) as well as traffic light information are collected via the communication network, and the collected information are processed by the information providing center 40 (for example, a server) according to Transport Protocol Expert Group (TPEG) standard so as to be sent to a broadcasting station. Accordingly, the broadcasting station inserts such traffic information including the traffic light information in a broadcast signal and broadcasts the broadcast signal to the telematics terminal 200. Here, the traffic light information may alternatively be received from a server installed in a traffic light when a vehicle approaches the corresponding traffic light.

The server may reconstruct various traffic information, which are collected via different paths connected to the communication network, for example, collected by an operator's input, via a wired/wireless Internet and digital broadcast services, such as Transport Data Channel (TDC) and Multimedia Object Transport (MOC), or from other servers or a probe car, into a traffic information format, such as a format according to the TPEG standard, which is a standard for traffic information services, thereby sending the reconstructed traffic information to the broadcasting station. The server may thus generate the traffic information format of the TPEG standard including traffic light information to send to the broadcasting station.

The broadcasting station may then load the traffic information including the traffic light information received from the server in a broadcast signal and wirelessly send the broadcast signal to the telematics terminal 200, for example, a navigation apparatus, which is mounted in the vehicle to play a role of a traffic information receiving terminal. The traffic information may include not only the traffic light information but also information related to various traffic conditions, which are required for running vehicles, ships and flights, such as accidents, road conditions, traffic jam, road construction, road block, public traffic network delay, flight delay and the like.

The broadcasting station may receive the traffic information including the traffic light information processed by the server, and send the same to the telematics terminal 200 via a digital signal according to various digital broadcasting standards, examples of which may include European Digital Audio Broadcasting (DAB) based on Eureka-147 (ETSI EN 300 401), Digital Multimedia Broadcasting-terrestrial/satellite (DMB-T/S), Digital Video Broadcasting-terrestrial (DVB-T), portable Digital Video Broadcasting-Handheld (DVB-H), Media Forward Link Only (MFLO) and the like.

Also, the broadcasting station may send the traffic information including the traffic light information via a wired/wireless network, such as a wired/wireless Internet. The vehicle having the telematics terminal 200 indicates any transport of a typical car, bus, train, ship, flight and the like, which are made by employing mechanical and electronic devices for the purpose of carrying or transporting humans or objects. The vehicle has a traffic information receiving terminal to receive traffic light information from the broadcasting station. The traffic light information is processed to be sent to a user in a graphic, text and/or audio format(s).

The telematics terminal 200 may include a mobile communication module. The mobile communication module may send and receive wireless signals to/from at least one of a base station 10, an external terminal and a server over a mobile communication network. Here, the wireless signals may include a voice call signal, a telephony call signal and/or various types of data in response to transmission/reception of text/multimedia messages.

The telematics terminal 200 may communicate with a vehicle terminal 700 using a wired/wireless communication technology. The vehicle terminal 700 may perform a typical vehicle control, provide vehicle related information such as speed, gear state and the like, turn an emergency light of the vehicle on/off, turn a headlight on/off, determine whether or not a passenger has taken a seat by a sensor installed within a seat in the vehicle, blow a horn and the like. The vehicle terminal 700 may include a HUD or projector.

Figure 1C:
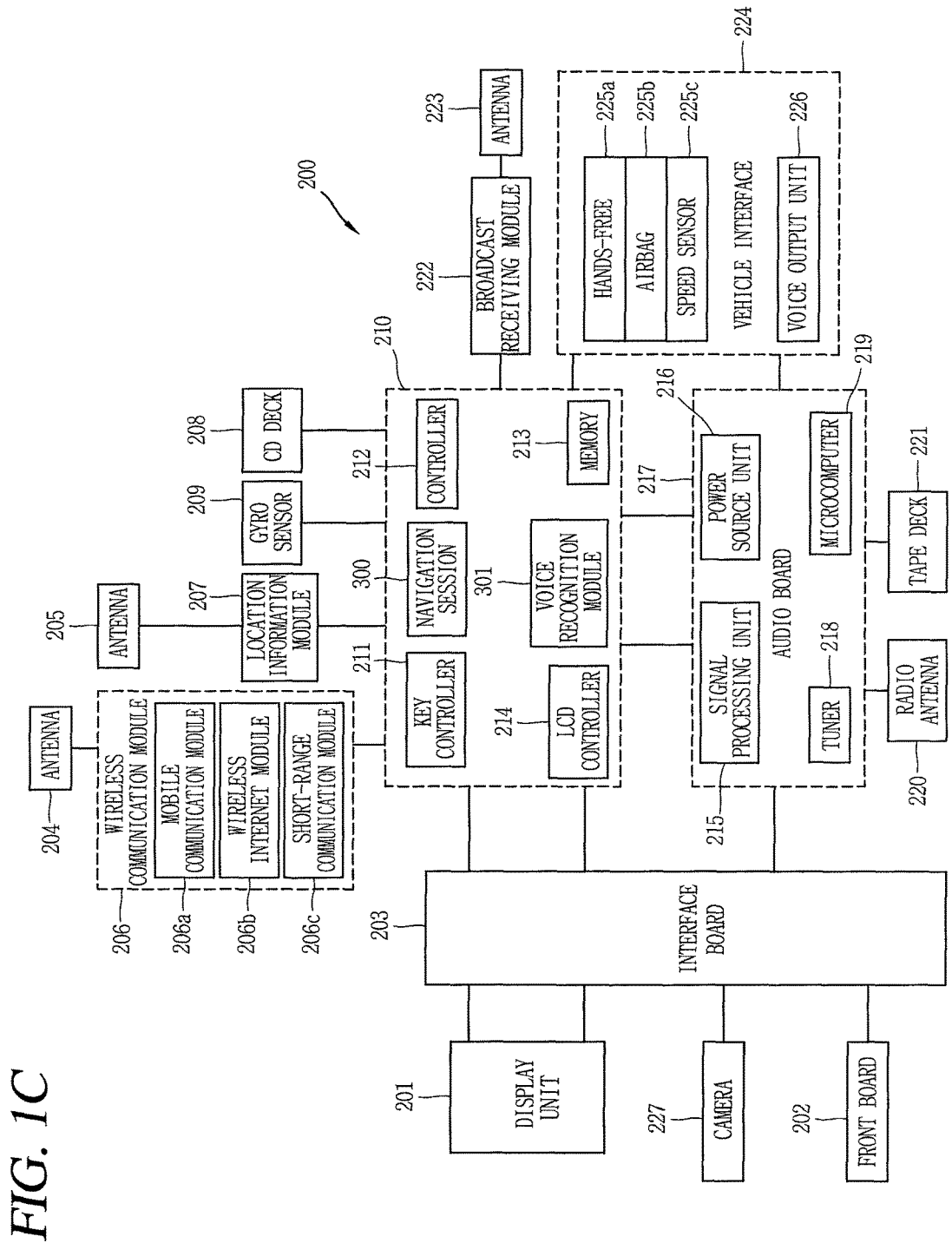
FIG. 1C is a block diagram illustrating a telematics terminal according to an exemplary embodiment.

FIG. 1C is a block diagram illustrating a configuration of a telematics terminal 200 according to an exemplary embodiment disclosed in this specification. As shown in FIG. 1C, the telematics terminal 200 may include a main board 210. The main board 210 may include a controller (for example, a central processing unit (CPU)) 212 for overall control of the telematics terminal 200, a memory 213 for storing various types of information, a key controller 211 for control of various types of key signals, and a liquid crystal display (LCD) controller 214 for control of LCD.

The memory 213 may store map information (map data) for displaying road guidance information on a digital map. Also, the memory 213 may store a traffic information collection control algorithm for allowing input of traffic information according to road conditions that a vehicle is currently traveling, and information for control of the algorithm.

The main board 210 may include a wireless communication module 206 for performing wireless communications between the telematics terminal 200 and a wireless communication system or between the telematics terminal 200 and a network in which the telematics terminal 200 is present, a location information module 207 for receiving a Global Positioning System (GPS) signal to guide a location of a vehicle, track a traveling route from a depart point to an arrival point, etc., or transmitting traffic information collected by a user using a GPS signal, a compact disk (CD) deck 208 for reproducing a signal recorded on a CD; a gyro sensor 209, and the like. The wireless communication module 206 and the location information module 207 may transmit and receive signals via corresponding antennas 204 and 205, respectively.

The wireless communication module 206 may include a mobile communication module 206a as a mobile communication terminal having a uniquely given device number for transmitting and receiving wireless signals with at least one of a base station, an external terminal and a sever over a mobile communication network, a wireless Internet module 206b for allowing wireless Internet access by technologies, such as Wireless LAN (WLAN), Wi-Fi, Wireless broadband (Wibro), World Interoperability for Microwave Access (Wimax), High Speed Downlink Package Access (HSDPA) and the like, and a short-range communication module 206c for performing communications by technologies, such as Bluetooth, Radio Frequency IDentification (RFID), Infrared Data Association (IrDA), Ultra WideBand (UWB), ZigBee, Wireless LAN (protocols such as Bluetooth, 802.11n, etc.) and the like.

The broadcast receiving module 222 may be connected to the main board 210 to receive a broadcast signal via an antenna 223. The main body 210 may be connected, via an interface board 203, with a display (LCD) 201 controlled by the LCD controller 214, a front board 202 controlled by the key controller 211, and a camera 227 for capturing inside and/or outside of the vehicle. The display 201 may display various video signals, text signals and the like. The front board 202 may be provided with buttons for various types of key signal inputs, and provide a key signal corresponding to the user-selected button to the main board 210. Also, the display 201 may include the proximity sensor and the touch sensor (touch screen) shown in FIG. 2.

The front board 202 may include a menu key for allowing direct input of traffic information. The menu key may be controlled by the key controller 211. An audio board 217 may be connected to the main board 210 to process various audio signals. The audio board 217 may include a microcomputer 219 for control of the audio board 217, a tuner 218 for receiving a radio signal, a power supply unit 216 for supplying power to the microcomputer 219, and a signal processor 215 for processing various audio signals.

The audio board 217 may also include a radio antenna 220 for receiving a radio signal, and a tape deck 221 for reproducing an audio tape. The audio board 217 may further include an audio output unit (for example, amplifier) 226 for outputting an audio (voice) signal processed in the audio board 217.

The audio output unit (amplifier) 226 may be connected to a vehicle interface 224. That is, the audio board 217 and the main board 210 may be connected to the vehicle interface 224. The vehicle interface 224 may also be provided for connection of a hands-free 225a for inputting a voice signal, an airbag 226b for safety of a passenger, a speed (velocity) sensor 225c for detecting the vehicle speed, and the like. The speed sensor 225c may calculate the vehicle speed and provide the calculated speed information to the controller (CPU) 212.

A navigation session 300 applied to the telematics terminal 200 may generate road guidance information based upon map data and current location information related to the vehicle, and notify a user of the generated road guidance information. The display 201 may detect a proximity touch within a display window via a proximity sensor. For example, the display 201 detects a location of a proximity touch when a pointer (for example, a finger or a stylus pen) generates the proximity touch, and outputs location information corresponding to the detected location to the controller 212.

A voice recognition device (or voice recognition module) 301 may recognize a user's voice, and perform a corresponding function according to the recognized voice signal. The navigation session 300 applied to the telematics terminal 200 may display a travel path on map data. At least some of the components may operate in cooperation with each other so as to implement an operation, control, or control method of the vehicle according to various exemplary embodiments which will be described below. Also, the operation, control, or control method of the vehicle may be implemented in the vehicle by driving of at least one application program stored in the memory 170.

Hereinafter, exemplary embodiments related to a vehicle control method capable of being implemented in a vehicle control device or telematics terminal including one or more among the components described in FIGS. 1A and 1C will be described with the accompanying drawings. It is obvious to those skilled in the art that the present disclosure may be embodied in other specific forms without departing from the spirit or essential attributes thereof. In the following description, a control method will be described based on the vehicle control device. However, the same control method may be applied to the telematics terminal.

In the description of the following figures, figures will be sequentially described in a clockwise order or vertical order, based on a figure drawn at a left top side. The present disclosure can control a vehicle by using sound information corresponding to a sound generated around the vehicle. Hereinafter, a method in which the vehicle control device according to an embodiment of the present disclosure controls a vehicle, based on sound information corresponding to a sound generated around the vehicle will be described with reference to the accompanying drawings.

Figure 2:
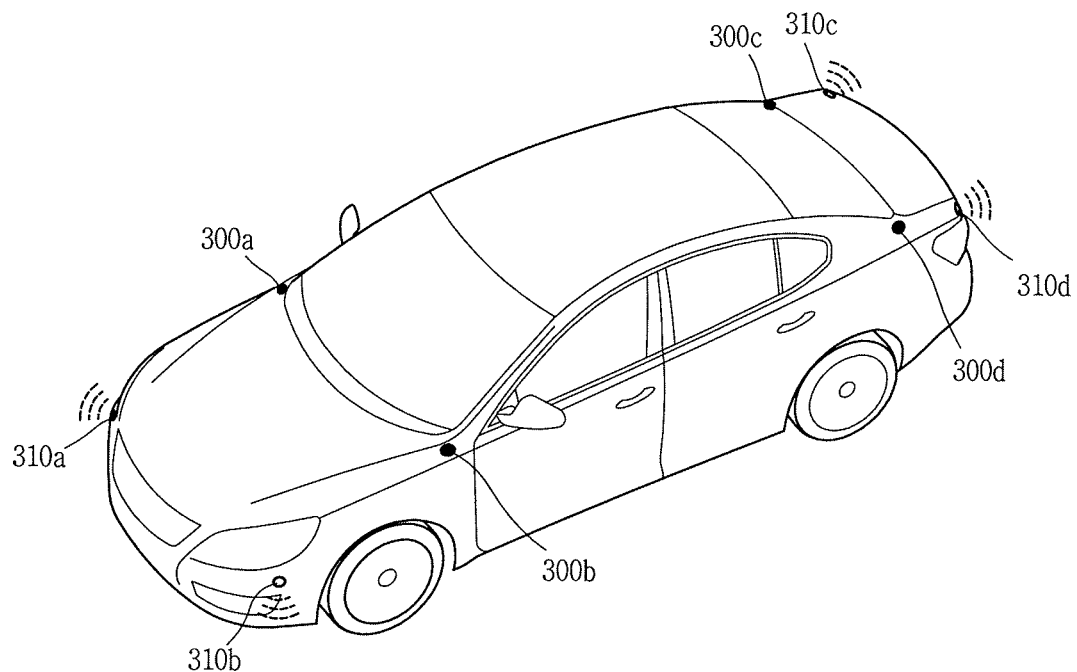
FIG. 2 is a conceptual diagram illustrating an arrangement of sensors provided in a vehicle in the vehicle control device according to an exemplary embodiment.

FIG. 2 is a conceptual diagram illustrating an arrangement of sensors provided in a vehicle in the vehicle control device according to an exemplary embodiment. The vehicle control device according to an embodiment of the present disclosure can include a sound sensor 143 (or a sound sensing unit), a microphone 122, a sound output unit 152, and a camera 121 including an image sensor. The present disclosure can sense a sound inside or outside of the vehicle through the sound sensor 143 provided separately or included in the microphone 122.

The sound sensor 143 may be configured to sense a sound inside or outside the vehicle. For example, the sound sensor 143 may be an ultrasonic sensor for sensing a sound having a frequency higher than an audio frequency, a seismic sensor for sensing a sound having a frequency lower than the audio frequency, a voice recognition sensor for sensing a sound having the audio frequency, or the like. That is, the sound sensor 143 may sense a sound inside or outside vehicle, thereby generating audio data corresponding to the sound. The audio data may be understood as sound information.

The sound sensor 143 may have a high sensitivity to a sound generated in a predetermined direction. The sound sensor 143 may perform the same function of a directional microphone. Also, the sound sensor 143 may have a low sensitivity to a sound generated in a direction different from the predetermined direction. That is, the sound sensor 143 may better sense the sound generated in the predetermined direction than the sound generated in a direction different from the predetermined direction. For example, the sound sensor may better sense a sound generated in the front direction than a sound generated in the rear direction.

In the vehicle control device according to an embodiment of the present disclosure, the sound sensor 143 may be provided in plurality. In this instance, the sound sensors 143 may be arranged at different locations outside or inside the vehicle to sense sounds generated in various directions, based on the vehicle. As an example, as shown in FIG. 2, a plurality of sound sensors 300a, 300b, 300c, and 300d may be configured to sense sounds generated outside the vehicle. Among the plurality of sound sensors 300a, 300b, 300c, and 300d, two sound sensors 300a and 300b may be arranged at the front of the vehicle, and two sound sensors 300c and 300d may be arranged at the rear of the vehicle. The two sound sensors 300a and 300b at the front and the two sound sensors 300c and 300d at the rear may be arranged to be spaced apart from each other at left and right sides of a main body of the vehicle. Here, the sound sensors 300*a*, 300*b*, 300*c*, and 300*d* arranged at the outside of the main body of the vehicle may be understood as the same meaning as the term "external sound sensing unit."

As another example, the plurality of sound sensors may be arranged to be spaced apart from each other inside the main body of the vehicle so as to sense sounds generated inside the vehicle. For example, a plurality of sound sensors (sound sensors 320*a*, 320*c* are shown in the example in FIG. 4) may be arranged to be spaced apart from each other at front, rear, left and right sides inside the main body of the vehicle.

The sound output unit 152 can output a sound corresponding to the sound information. The sound output unit 152 can output a sound in a predetermined direction. The sound output unit 152 may serve as a directional speaker. That is, the sound output unit 151 may not output any sound in a direction different from the predetermined direction. For example, the sound output unit 152 can output a sound in a direction moved by 45 degrees clockwise, based on the front thereof. In this instance, the user located in another direction cannot hear the sound generated by the sound output unit 152.

In the vehicle, the sound output unit 151 may be provided in plurality. In this instance, like the above-described sound sensors, a plurality of sound output units 310*a*, 310*b*, 310*c*, and 310*d*, as shown in FIG. 2, may be arranged to be spaced apart from each other outside the main body of the vehicle, so that the vehicle outputs sounds in various directions. In addition, a plurality of sound output units (sound output units 330*a*, 330 are shown in the example in FIG. 4) may be arranged to be spaced apart from each other inside the main body of the vehicle.

The camera 121 may be configured to photograph (or capture) an inside or outside of the vehicle. The camera 121 may be provided in plurality so as to photograph images around the main body of the vehicle. For example, the plurality of cameras may be arranged at the front, rear, and both side mirrors of the main body of the vehicle, to photograph all front, rear, left, and right images of the vehicle. In this instance, the controller 180 can generate an image around the vehicle by synthesizing the front, rear, left, and right images, and display the generated image on the display unit 151. As such, a system for photographing an image around the vehicle based on a main body of the vehicle and providing an image as if the user views the image around the vehicle, viewed from the sky, may be called as an around view monitor (AVM) system.

In the above, the arrangement structure of the sound sensor 143, the sound output unit 152, and the camera 121 in the vehicle control device according to an embodiment of the present disclosure has been described. In the following description, the present disclosure will be described based on the vehicle in which each of the sound sensor 143, the sound output unit 152, and the camera 121 is provided in plurality. However, the present disclosure can be applied to the sound sensor 143, the sound output unit 152, and the camera 121 being provided as one system or when only one sound sensor, one sound output unit, and one camera are provided. Also, in the following description, the present disclosure will be described when assuming that the sound sensor and the sound output unit are a directional sound sensor and a directional sound output unit. However, the present disclosure may be applied to a general sound sensor and a general microphone.

Figure 3:
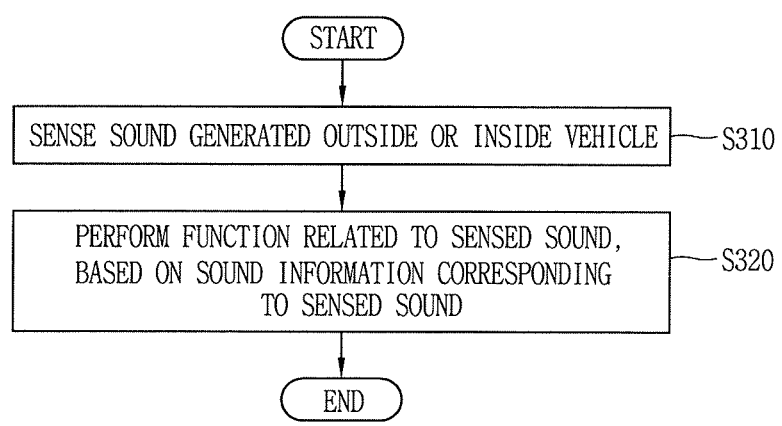
FIG. 3 is a flowchart illustrating a method of controlling the vehicle, based on sound information corresponding to a sound generated around the vehicle, in the vehicle control device according to an exemplary embodiment.

Hereinafter, a method of controlling the vehicle by using a sound generated around the vehicle in the vehicle control device according to an embodiment of the present disclosure will be described. In particular, FIG. 3 is a flowchart illustrating a method of controlling the vehicle, based on sound information corresponding to a sound generated around the vehicle, in the vehicle control device according to an exemplary embodiment. FIGS. 4A to 5D are conceptual diagrams illustrating the control method of FIG. 3.

First, the controller 180 in the vehicle control device according to an embodiment of the present disclosure can sense a sound generated outside or inside the vehicle (S310). The controller 180 can sense a sound generated outside or inside the vehicle through the sound sensor 143.

The sound generated outside or inside the vehicle may be a voice of the user located inside the vehicle, a sound caused by vibration of a main body of the vehicle, a sound generated from a component of the vehicle, a sound generated from a person located outside the vehicle, a sound generated from another vehicle, or the like. If the sound is sensed, the controller 180 in the vehicle control device according to an embodiment of the present disclosure performs a function related to the sensed sound, based on sound information corresponding to the sensed sound (S320).

If a sound is sensed by the sound sensor 143, the controller 180 can perform a function related to the sensed sound, based on sound information corresponding to the sensed sound. The sound information may include a frequency, a volume, a color timbre, a pitch, and a duration or length. The controller 180 can detect situation information, based on sound information corresponding to the sensed sound.

The situation information may include access information of an ambulance, location information of a sound generating source, state information of a road surface, vehicle call information, drive-through state information, external noise information, kind information of an external object, parking siren information, obstacle information, and the like. The controller 180 can detect sound information corresponding to the sensed sound information among a plurality of sound information stored in the memory 170.

Situation information respectively corresponding to the plurality of sound information may be stored in the memory 170. For example, first situation information corresponding to first sound information and second situation information corresponding to second sound information may be stored in the memory. Therefore, the controller 180 can detect situation information stored in the memory 170, which corresponds to the sound information corresponding to the sensed sound. For example, when the sound information corresponding to the sensed sound corresponds to siren sound information of an ambulance, the controller 180 can detect situation information representing that the ambulance is approaching.

The controller 180 can detect a location of a sound generating source which generates sounds sensed by the plurality of sound sensors 143, based on sound information corresponding to the sensed sounds. More specifically, the controller 180 can sense sounds generated from a sound generating source by using the plurality of sound sensors 143, and detect a location of the sound generating source by using a plurality of sound information respectively corresponding to the sounds sensed by the plurality of sound sensors 143. For example, the controller 180 can detect a location of a sound generating source, based on information on a point of time when a sound is sensed by each sound sensor 143 and a volume of the sensed sound.

The controller 180 can detect road surface state information, based on the sound information. The road surface state information may be information representing a state of a road surface. For example, the road surface state information may be friction information of the road surface, information on the presence of an obstacle on the road surface, or the like.

More specifically, the controller 180 can detect a frictional force of a road surface, based on a frictional sound generated between a wheel and the road surface. For example, when a frictional sound generated between the wheel and the road surface due to moisture on the road surface, the controller 180 can detect that the frictional force of the road surface is small, based on the frictional sound generated between the wheel and the road surface. Thus, the user can recognize a fact that the vehicle may be slid due to a small frictional force between the wheel and the road surface and control the vehicle by considering the fact.

When sound information including a predetermined word is sensed or when a sound having a volume equal to or greater than a predetermined volume is sensed within a certain distance, the controller 180 can detect vehicle call information. The vehicle call information may be information representing whether the vehicle has been called from the outside. As an example, the vehicle call information may be detected based on sound information including a driver's name, a number plate of the vehicle, and a predetermined vehicle number. As another example, the vehicle call information may be detected based on sound information having a volume equal to or greater than the predetermined volume, within a certain distance from the vehicle.

The controller 180 can detect drive-through state information, based on at least one of the sound information including the predetermined word and the location information. The drive-through state information may be information representing a state in which the driver intends to order food inside the vehicle. As an example, the drive-through state information may be detected based on sound information including words "Are you ready to order?" As another example, the drive-through state information may be detected based on location information of a specific restaurant.

The controller 180 can detect external noise information, kind information of an external object, or parking siren information, based on an external sound. The external noise information may be information on the amount of external noise. The kind information of the external object may be kind information of a sound generating source such as an ambulance, a bicycle, or a person.

If situation information is detected based on a sound, the controller 180 can recommend, to the user, functions suitable for the situation information, or automatically perform the functions suitable for the situation information. The functions suitable for the situation information may be functions related to the sound.

Figure 4A:
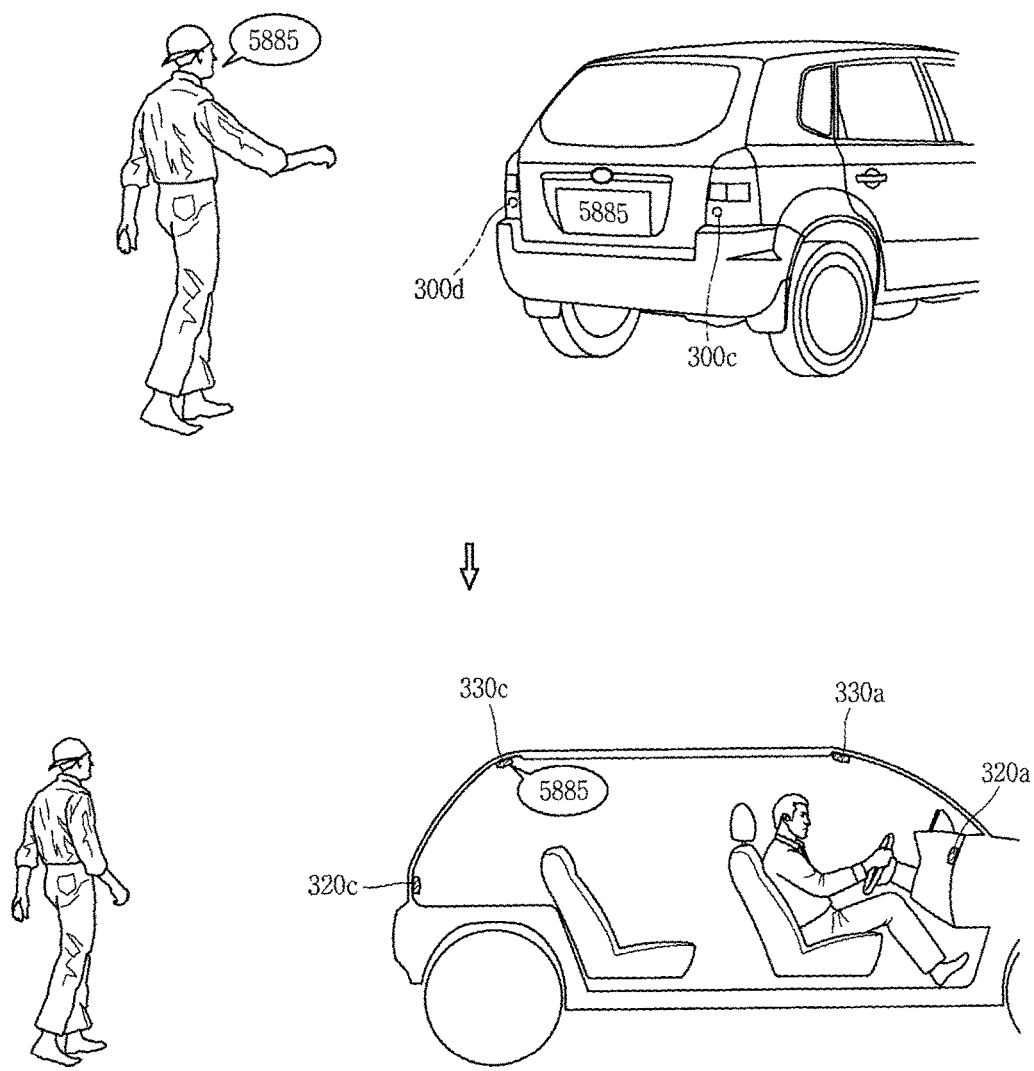
FIGS. 4A to 5D are conceptual diagrams illustrating the control method of FIG. 3.

The functions related to the sound may be a function using, as input information, sound information corresponding to the sound, a function of outputting the sound and notification information related to the sound, a function of displaying information related to sound information corresponding to the sound, and the like. For example, as shown in FIG. 4A, if it is sensed that a sound calling the vehicle from the outside is generated, the controller 180 can activate the sound sensor 143 and the sound output unit 152 such that the user inside the vehicle has a conversation with a sound generating source generating the sound.

Here, the activation corresponds to the sound sensor or the sound output unit sensing or outputting a sound as power is supplied to the sound sensor or the sound output unit. On the contrary, the non-activation corresponds to the sound sensor or the sound output unit not sensing or outputting any sound as the supply of power to the sound sensor or the sound output unit is cut off.

That is, when a plurality of sound sensors and a plurality of sound output units are arranged to be space apart from each other inside or outside of the vehicle, the controller 180 can detect a location of a sound generating source, based on a sound calling the vehicle. Also, the controller 180 can activate at least one sound sensor 143 and at least one sound output unit 152, which are located corresponding to the location of the sound generating source, among the plurality of sound sensors 143 and the plurality of sound output units 152, to output a sound toward the location of the sound generating source or sense a sound generated at the location of the sound generating source.

In addition, the controller 180 can decrease the sensitivity of the sound or the output magnitude of the sound with respect to the other sound sensors and the other sound output units, which are not arranged at a location corresponding to the location of the sound generating source. Further, the controller 180 can non-activate the other sound sensors and the other sound output units, which are not arranged at a location corresponding to the location of the sound generating source.

That is, the present disclosure can provide a method in which a sound generated from a sound generating source is more sensitively sensed, and a sound output toward the sound generating source is more loudly output, thereby smoothly performing conversation between the sound generating source and the vehicle. For example, as shown in FIG. 4A, the controller 180 can sense that a sound including a word called "5885" which designates the number plate of the vehicle has been generated. In this instance, the controller 180 can determine the sound as a sound calling the vehicle, and detect a sound generating source of the sound, based on sound information corresponding to the sound.

Figure 4B:
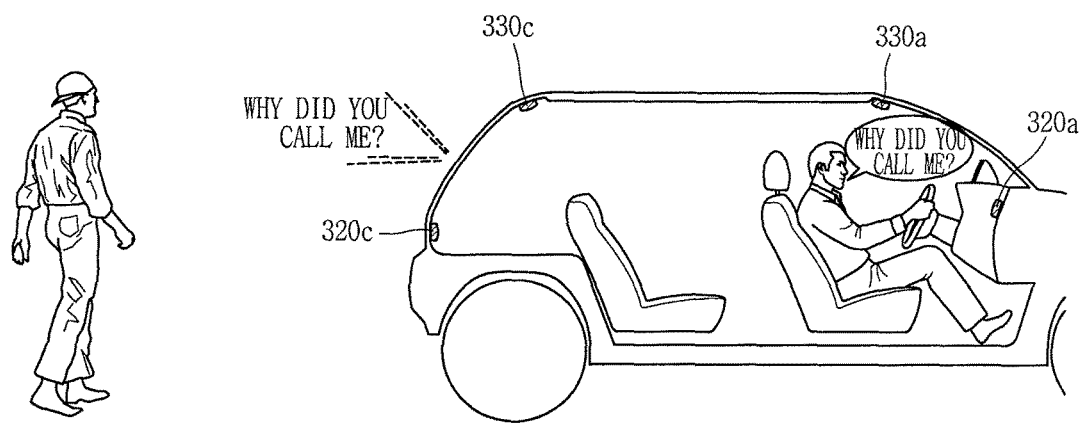

When the sound generating source is located at the rear of the vehicle, as shown in FIGS. 4A and 4B, the controller 180 can activate the sound sensor and the sound output unit, which are arranged at the rear of the vehicle, among the plurality of sound sensors and the plurality of sound output units. Thus, the user can hear a sound called "5885" generated at the rear of the vehicle through the sound output unit disposed at the rear of the vehicle. Also, the user can transmit a voice called "Why are you calling me?" or "Why did you call me?" to the sound generating source located at the rear of the vehicle through the sound output unit disposed at the rear of the vehicle.

Accordingly, the user can hear a sound generated by the sound generating source at the rear of the vehicle, to intuitively determine the location of the sound generating source. Further, the user can transmit a sound to the sound generating source at the rear of the vehicle, to have a conversation with the sound generating source. The controller 180 can decrease or non-activate the sensitivity of the other sound sensors and the other sound output units, which are not located corresponding to the location of the sound generating source. Thus, in an embodiment of the present disclosure, it is possible to intercept a sound causing an interruption in the conversation between the user and the sound generating source.

When a predetermined condition is satisfied, the controller 180 can control the camera 121 such that an image of the sound generating source is displayed on the display unit 151. The predetermined condition may include at least one of a condition that the sound information is siren information of an ambulance, a condition that the sound generating source is located beyond a driver's viewing angle, a condition that the number of obstacles around the vehicle is equal to or greater than a predetermined number, a condition that the sound generating source is located out of a predetermined distance from the vehicle, and a condition that the vehicle is currently located at a traffic accident black spot.

Figure 4C:
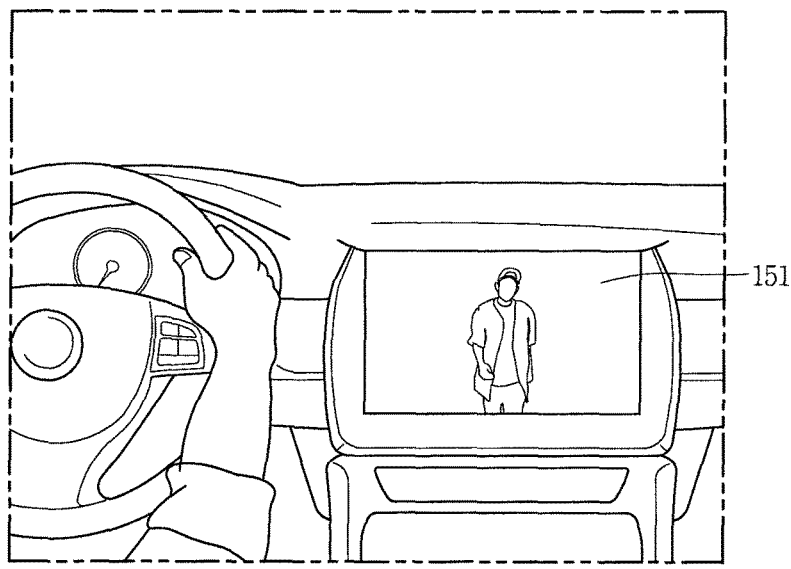

As an example, as shown in FIG. 4C, when it is determined that a sound generating source has been located at the rear of the vehicle, which is out of the driver's viewing angle, the controller 180 can photograph an image of the sound generating source through the camera 121, and display the image of the sound generating source (person) on the display unit 151 disposed at a cluster of the vehicle. Thus, the user can identify the sound generating source out of the user's eyes without moving the user's eyes. Here, the user's viewing angle may be sensed through an eye sensing unit for sensing the driver's eyes. The eye sensing unit is configured to sense the user's eyes. For example, the eye sensing unit may be configured as a camera for photographing the driver's eyes.

As another example, when a sound generating source is located out of a predetermined distance from the vehicle, the controller 180 can photograph an image of the sound generating source through the camera 121, and display the image of the sound generating source on the display unit 151. Thus, when a sound generating source is located distant from the vehicle even though the sound generating source is located within the user's eyes, the user can identify an image of the sound generating source through the display unit 151.

When a predetermined condition for displaying an image of the sound generating source is not satisfied, the controller 180 can not display the image of the sound generating source on the display unit 151. As an example, when it is determined that the sound generating source has been located within the driver's viewing angle, the controller 180 can not display an image of the sound generating source on the display unit 151. In this instance, the controller 180 can not separately display the image of the sound generating source on the display unit 151 by determining that the driver can directly identify the sound generating source.

As another example, when the sound generating source is located within a predetermined distance from the vehicle, the controller 180 can not display an image of the sound generating source on the display unit 151. In this instance, the controller 180 can not display the image of the sound generating source on the display unit 151 by determining that the driver can sufficiently recognize the sound generating source.

Figure 5A:
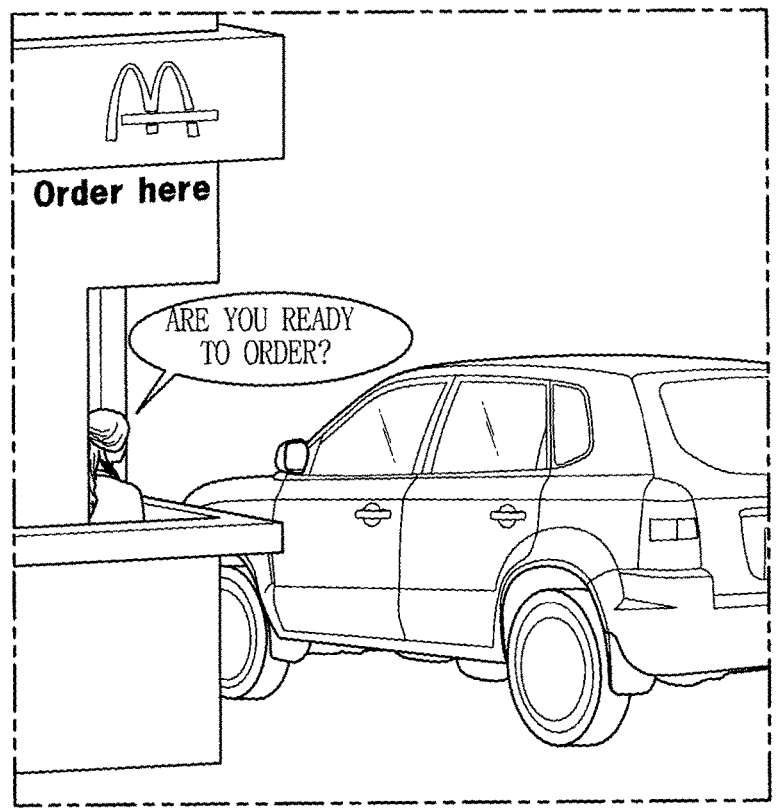

In addition, the controller 180 can detect situation information, based on at least one of location information and sound information, and perform a function related to a sound, based on the situation information. For example, as shown in FIG. 5A, the controller 180 can detect drive-through situation information, based on at least one of location information where a drive-through is possible and sound information corresponding to a voice called "Are you ready to order?".

If the drive-through situation information is sensed, the controller 180 can activate the sound sensor 143 and the sound output unit 152 such that the driver can have a conversation with a sound generating source. In this instance, the controller 180 can detect a location of the sound generating source, based on the sound information, and control the sound sensor 143 and the sound output unit 152 such that the driver has a conversation with the sound generating source. That is, when a plurality of sound sensors and a plurality of sound output units are provided, the controller 180 can activate at least one sound sensor and at least one sound output unit, which are located at a location corresponding to that of the sound generating source.

Figure 5B:

As shown in FIG. 5B, when the sound generating source is located in the direction of a driver's seat, the controller 180 can activate a sound sensor and a sound output unit, which are located at a location corresponding to the direction of the driver's seat. That is, the controller 180 can output a sound called "Are you ready to order?" through the sound output unit located at the location corresponding to the direction of the driver's seat.

Figure 5C:
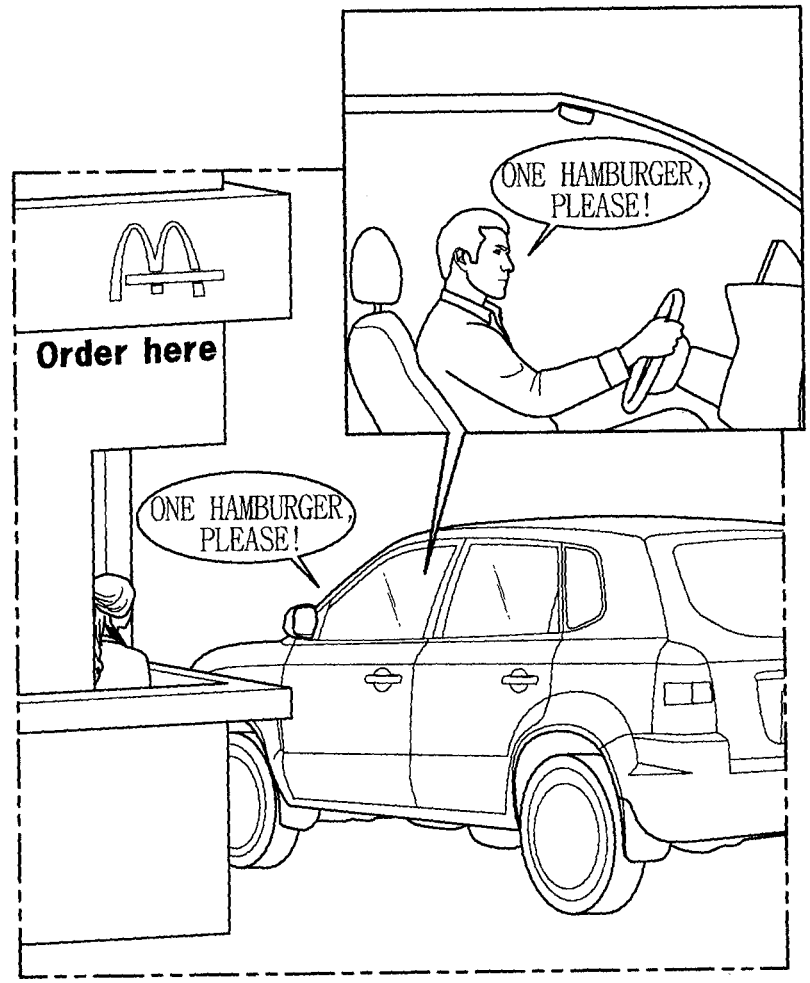

As shown in FIG. 5C, the controller 180 can output a sound called "One hamburger, please" through a sound output unit located at the location corresponding to the direction of the driver's seat such that a speech sound of the driver located inside the vehicle faces the sound generating source located outside the vehicle. Thus, the driver can have a conversation with the sound generating source without opening a window of the vehicle.

Figure 5D:
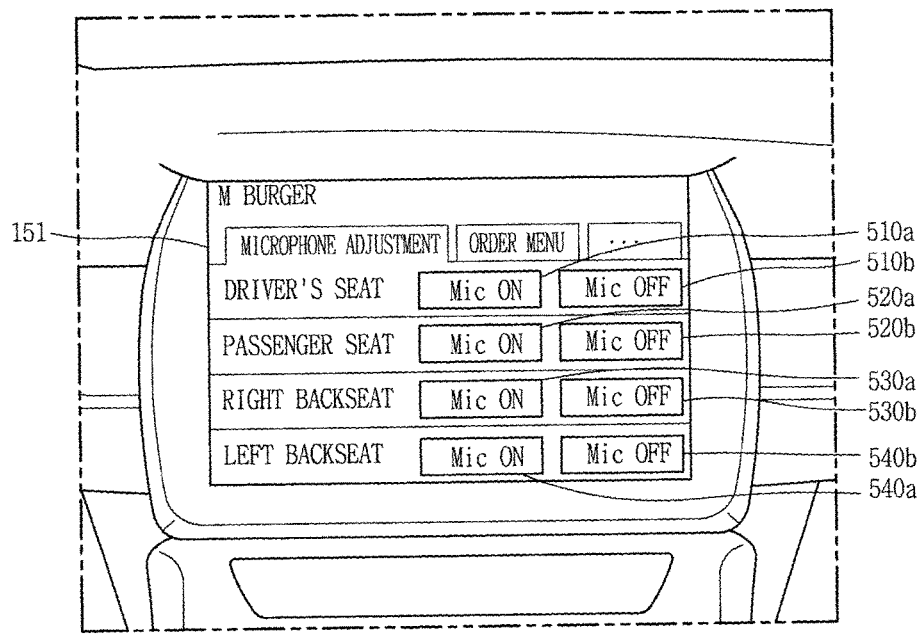

As shown in FIG. 5D, if the drive-through situation information is detected, the controller 180 can display screen information related to the drive-through situation information on the display unit 151. The screen information related to the drive-through situation information may include menu information of a restaurant, price information, discount coupon information, and graphic objects for controlling the sound output units.

The information for determining whether the sound sensors and the sound output units are activated may be graphic objects related to functions of respectively controlling the activations of the sound sensors and the sound output units, which are arranged to be spaced apart from each other. For example, as shown in FIG. 5D, graphic objects 510a and 510b for activation and non-activation of the sound output unit disposed at a location corresponding to the driver's seat, graphic objects 520a and 520b for activation and non-activation of the sound output unit disposed at a location corresponding to a passenger seat, and graphic objects 530a to 540b for activation and non-activation of the sound output units respectively disposed at locations corresponding to backseats may be displayed on the display unit 151.

The controller 180 can control the activation of each of the sound sensors and the sound output units, based on a touch input applied to the graphic objects related to the functions of respectively controlling the activations of the sound sensors and the sound output units, which are arranged to be spaced apart from each other. For example, the controller 180 can activate the sound output unit disposed at the location corresponding to the passenger seat, based on a touch input applied to the graphic object 520a for activation of the sound output unit disposed at the location corresponding to the passenger seat. Similarly, the controller 180 can non-activate the sound output unit disposed at the location corresponding to the passenger seat, based on a touch input applied to the graphic object 520b for non-activation of the sound output unit disposed at the location corresponding to the passenger seat. Accordingly, in addition to the driver located at the driver's seat, the user located at the passenger seat can also have a conversation with an external sound generating source so as to directly order food.

Meanwhile, the controller 180 can sense an opening state of a window while the driver is having a conversation with the external sound generating source through the sound sensor and the sound output unit. In this instance, the controller 180 can determine whether the sound sensor and the sound output unit are activated, based on the opening state of the window.

More specifically, if it is sensed that the state of the window is changed from a state in which the window is closed to a state in which the window is opened, the controller 180 can non-activate the sound sensor and the sound output unit. That is, when a sound inside the vehicle is to be directly transmitted to the outside of the vehicle as the window is opened, the vehicle control device according to an embodiment of the present disclosure may not perform the function of transmitting a sound through the sound sensor and the sound output unit. Therefore, the vehicle control device according to an embodiment of the present disclosure may not activate unnecessary sound sensors and sound output units.

In addition, when it is determined that the sound generating source is a pedestrian having the risk of vehicle accidents, the controller 180 can output notification information. In this instance, it may be determined, based on sound information, whether the sound generating source is the pedestrian having the risk of vehicle accidents. More specifically, when the sound generating source is located within a predetermined distance from the vehicle, the controller 180 can determine that the sound generating source is a pedestrian having the risk of vehicle accidents. On the contrary, when the sound generating source is not located within the predetermined distance from the vehicle, the controller 180 can determine that the sound generating source is a pedestrian having no risk of vehicle accidents.

The notification information may be output in any one of visual, auditory, and haptic manners. For example, the notification information may become a voice called "Watch out!" or light output toward the pedestrian from a lamp. For example, when the sound generating source is located within the predetermined distance from the vehicle, the controller 180 can output notification information called "Watch out!" through the sound output unit 152.

On the contrary, when the sound generating source is not located within the predetermined distance from the vehicle, the controller 180 can control the sound output unit 152 such that the notification information is not output through the sound output unit 152.

The vehicle control device according to an embodiment of the present disclosure can operate a lamp drive unit such that light is output toward a sound generating source. In this instance, the light may be output from the lamp drive unit in the same manner as a sound is output through the sound sensor and the sound output unit as described above. For example, the controller 180 can control the lamp drive unit such that light faces the location of the sound generating source.

Figure 6A:
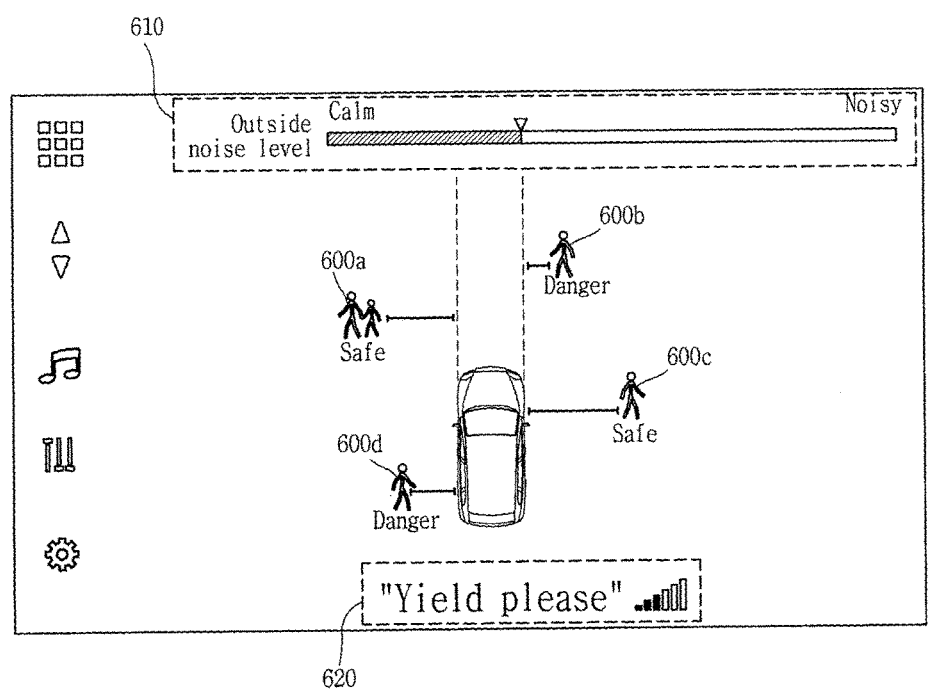
FIGS. 6A to 6C are conceptual diagrams illustrating a method of controlling the vehicle, based on situation information displayed in a display unit.
Figure 6B:
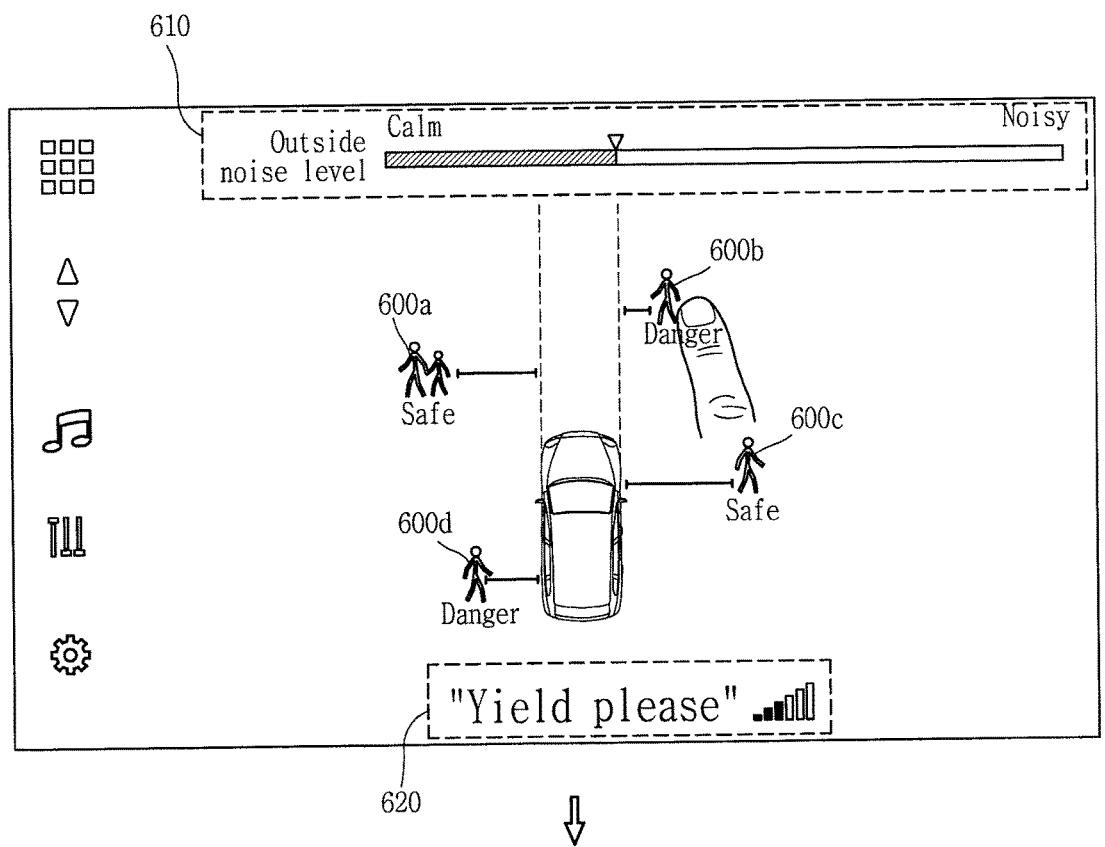
Figure 6B:
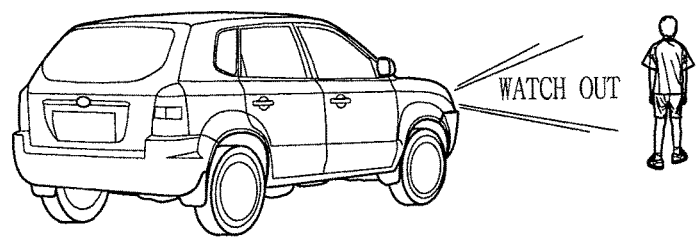
Figure 6C:
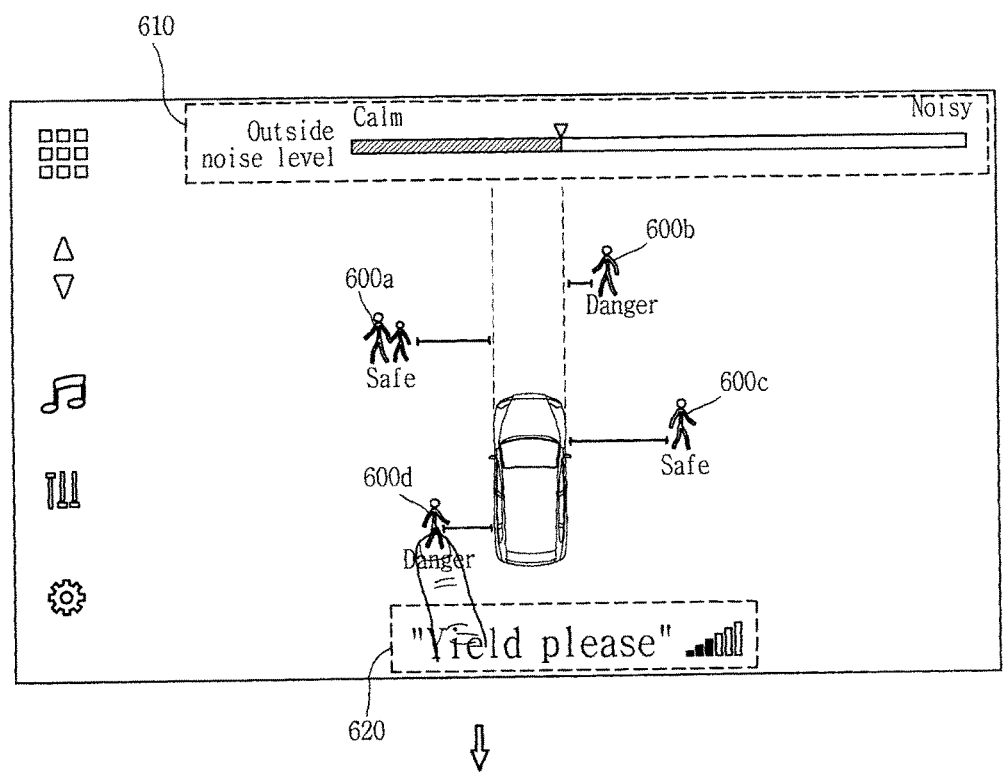
Figure 6C:
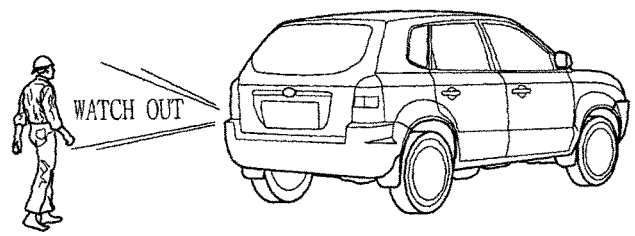

In the above, the method of detecting situation information and providing functions suitable for the situation information, based on a sound generated around the vehicle, has been described. Hereinafter, a method of displaying situation information detected based on a sound generated around the vehicle and controlling the vehicle based on the situation information displayed on the display unit will be described. FIGS. 6A to 6C are conceptual diagrams illustrating a method of controlling the vehicle, based on situation information displayed on the display unit.

The controller 180 in the vehicle control device according to an embodiment of the present disclosure can detect situation information around the vehicle by sensing a sound generated inside or outside the vehicle. In this instance, in order to visually provide the situation information to the user, the controller 180 can convert the situation information into a graphic object or text, and display the converted graphic object or text on the display unit 151. In addition to the graphic object or text, the controller 180 can display, as the situation information, an image obtained by photographing a situation around the vehicle, on the display unit 151.

For example, as shown in FIG. 6A, the controller 180 can display, on the display unit 151, graphic objects 600*a*, 600*b*, 600*c*, and 600*d* representing at least one sound generating source, a graphic object 610 representing a magnitude of an external sound, and a graphic object 620 representing an output magnitude of notification information.

The at least one sound generating source may be a person, a bicycle, a vehicle, a building, etc. In this instance, the controller 180 can determine a kind of the sound generating source, based on sound information corresponding to a sound. Also, the controller 180 can display sound generating sources as different graphic objects according to kinds of the sound generating sources. For example, if it is determined that the sound generating source is a person, the controller 180 can display a person-shaped graphic object. If it is determined that the sound generating source is a bicycle, the controller 180 can display a bicycle-shaped graphic object.

The controller 180 can detect a location of a sound generating source, based on sound information. Also, the controller 180 can display a graphic object representing the sound generating source on an area corresponding to the location of the sound generating source in the entire area on the display unit 151. For example, as shown in FIG. 6A, the controller 180 can display at least one of the graphic objects 600*a*, 600*b*, 600*c*, and 600*d* representing at least one sound generating source on an area corresponding to the location of the graphic object representing the at least one sound generating source.

The controller 180 can detect a safety degree of the sound generating source, based on sound information, and display the detected safety degree on the display unit 151. The safety degree refers to information representing a risk degree of an accident between the sound generating source and the vehicle. If the risk of accidents is low, the safety degree may be high. If the risk of accidents is high, the safety degree may be low.

For example, as shown in FIG. 6A, the controller 180 can display "safe" representing that the safety degree is high on an area adjacent to a sound generating source of which safety degree is determined to be high, and display "danger" representing that the safety degree is low on an area adjacent to a sound generating source of which safety degree is determined to be low.

The graphic object 610 representing a magnitude of an external sound may represent magnitude information of a sensed sound. For example, as shown in FIG. 6A, the controller 180 can display the magnitude information of the external sound as a bar-shaped graph. The graphic object 620 representing an output magnitude of the notification information may represent an output magnitude of a sound set to output the notification information to the outside. For example, as shown in FIG. 6A, the controller 180 can display an output magnitude of a sound set such that notification information called "Yield please" is output with a magnitude of 4.

When a user's request or the sound information satisfies a predetermined condition, the controller 180 can convert the sound information into a graphic object or text, and display the converted graphic object or text on the display unit 151. The predetermined condition may be a condition in which it is required that additional information is to be visually provided during driving of the vehicle. For example, the predetermined condition may be a condition in which it is determined that the vehicle has entered into an alley, a condition in which the number of obstacles sensed around the vehicle is equal to or greater than a predetermined number, a condition in which the magnitude of an external sound is equal to or greater than a predetermined value, a condition in which the vehicle enters into a traffic accident black spot, or the like.

That is, the vehicle control device according to an embodiment of the present disclosure can visually provide the user with obstacles around the vehicle in a situation in which the user drive the vehicle while decreasing the speed of the vehicle and avoiding the obstacles around the vehicle. The controller 180 can output notification information, based on a touch input applied to the display unit 151. More specifically, the controller 180 can control the sound output unit 151 such that notification information is output toward a sound generating source represented by any one graphic object among the graphic objects 600*a* to 600*d* representing the at least one sound generating source displayed on the display unit 151, in repose to a touch input applied to the one graphic object. Here, the controlling of the sound output unit 152 may mean activating a sound output unit disposed at a location corresponding to the location of the sound generating source to which the touch input is applied among the plurality of sound output units provided in the vehicle and non-activating the other sound output units.

As an example, as shown in FIG. 6B, the controller 180 can control the sound output unit disposed at the front of the vehicle to output a sound called "Watch out!" toward a sound generating source represented by any one graphic object 600*b* among the graphic objects 600*a* to 600*d* in response to a touch input applied to the graphic object 600*b*.

As another example, as shown in FIG. 6C, the controller 180 can control the sound output unit disposed at the rear of the vehicle to output a sound called "Watch out!" toward a sound generating source represented by another graphic object 600*d* among the graphic objects 600*a* to 600*d* in response to a touch input applied to the graphic object 600*d*. Thus, a selected sound generating source can accurately hear notification information output there toward. Also, the other sound generating sources except the selected sound generating source do not heat unnecessary notification information.

The controller 180 can determine an output magnitude of notification information, based on at least one of a relative distance between the sound generating source and the vehicle and an external noise degree. The output magnitude may be a volume of the notification information output in the auditory manner. As an example, when the relative distance between the sound generating source and the vehicle is a first distance, the controller 180 can output the notification information with a first volume. When the relative distance between the sound generating source and the vehicle is a second distance shorter than the first distance, the controller 180 can output the notification information with a second volume smaller than the first volume. As another example, when the external noise degree has a first value, the controller 180 can output the notification information with a first volume. When the external noise degree has a second value greater than the first value, the controller 180 can output the notification information with a second volume greater than the first volume.

When the sound generating source is a pedestrian, the controller 180 can output different notification information, based on image information of the sound generating source. In this instance, the image information of the sound generating source may be received through the camera.

More specifically, the controller 180 can analyze the image information of the sound generating source, based on a predetermined algorithm, and determine the age and sex of the sound generating source. An algorithm for determining the age and sex of a person included in an image may be generally used as the predetermined algorithm.

As an example, if it is determined that the sound generating source is an older pedestrian, the controller 180 can output polite notification information called "Please, give way to me." If it is determined that the sound generating source is a young pedestrian, the controller 180 can output providing a feeling as if the driver has a conversation with a friend.

As another example, when the sound generating source is a woman, the controller 180 can output a sound called "Beautiful lady." When the sound generating source is a man, the controller 180 can output a sound called "Gentleman." In addition, the controller 180 can also display, on the display unit 151, a conversation record obtained by performing conversation between a sound generating source and a person inside the vehicle.

Figure 7A:
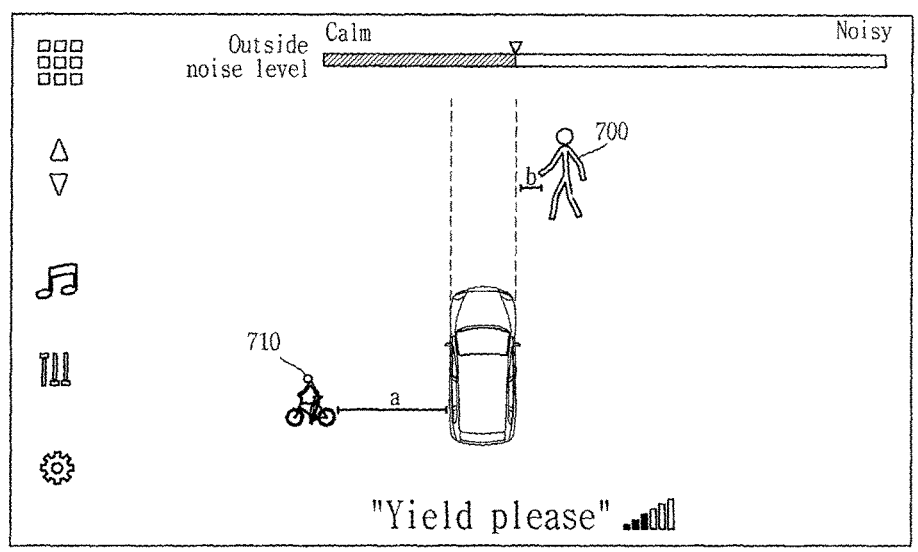
FIGS. 7A and 7B are conceptual diagrams illustrating a method of displaying graphic objects displayed on the display unit in different output forms, based on sound information.
Figure 7B:
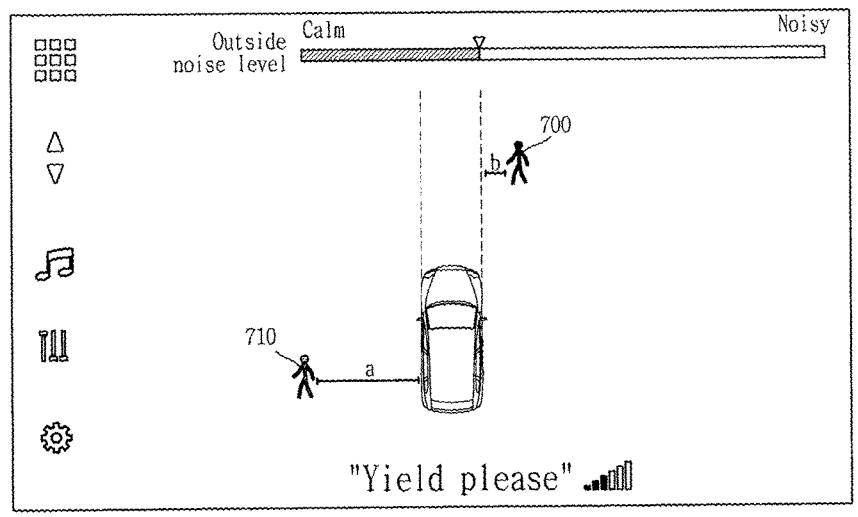

In the above, the method of controlling the vehicle through a touch input applied to the display unit has been described. Hereinafter, a method of displaying a graphic object displayed on the display unit in different output forms, based on sound information will be described. FIGS. 7A and 7B are conceptual diagrams illustrating a method of displaying graphic objects displayed on the display unit in different output forms, based on sound information.

The controller 180 in the vehicle control device according to an embodiment of the present disclosure can sense a sound around the vehicle, and based on sound information corresponding to the sensed sound, convert the sound information into a graphic object and then display the converted graphic object on the display unit 151.

In this instance, the controller 180 can convert the sound information into graphic objects of different forms, based on the sound information. More specifically, the controller 180 can detect a relative distance between the vehicle and a sound generating source, based on the sound information, and display the sound information with different output magnitudes according to the relative distance.

For example, as shown in FIG. 7A, when the relative distance between a first sound generating source and the vehicle is a first distance, the controller 180 can display a graphic object 700 representing the first sound generating source with a first magnitude. When the relative distance between a second sound generating source and the vehicle is a second distance longer than the first distance, the controller 180 can display a graphic object 710 representing the second sound generating source with a second magnitude smaller than the first magnitude. Thus, the user can intuitively recognize a relative distance between a sound generating source and the vehicle.

The controller 180 can detect a traffic accident risk degree of a sound generating source, based on sound information. Here, the traffic accident risk degree may refer to a risk occurrence degree of a traffic accident. More specifically, based on sound information, the controller 180 can detect a traffic accident risk degree, based on a variation in relative distance between a sound generating source and the vehicle and a relative speed between the sound generating source and the vehicle. For example, when the relative distance between the sound generating source and the vehicle is decreased, and the relative speed between the sound generating source and the vehicle is gradually increased, the controller 180 can determine that the traffic accident risk degree is low.

In this instance, the controller 180 can output graphic objects representing sound generating sources in different colors according to traffic accident risk degrees. For example, as shown in FIG. 7B, when the traffic accident risk degree of the first sound generating source has a first value, the controller 180 can display the graphic object 700 representing the first sound generating source in a red color. When the traffic accident risk degree of the second sound generating source has a second value smaller than the first value, the controller 180 can display the graphic object 710 representing the second sound generating source in a black color. That is, the controller 180 can previously store a color corresponding to each traffic accident risk degree, and determine an output color of a graphic object according to the previously stored colors. Thus, the user can intuitively determine a traffic accident risk degree related to a sound generating source located around the vehicle.

Figure 8A:
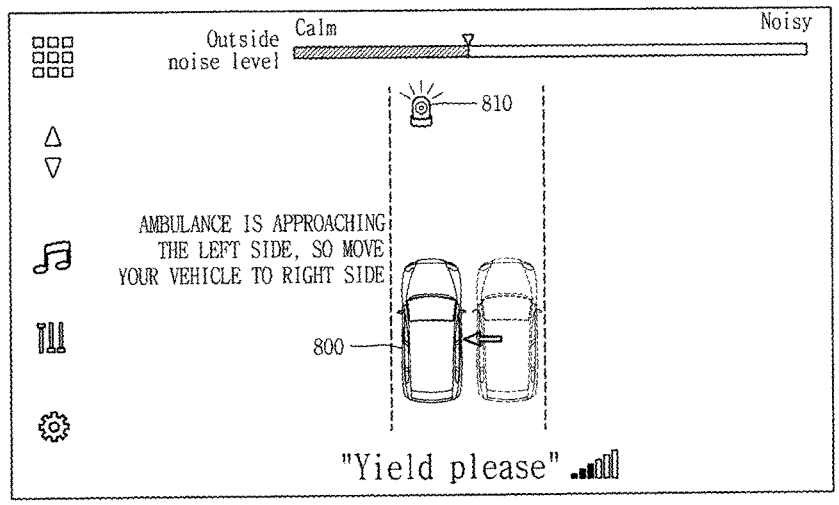
FIGS. 8A and 8B are conceptual diagrams illustrating a method of providing driving guidance information, based on sound information corresponding to a sound generated around the vehicle.
Figure 8B:
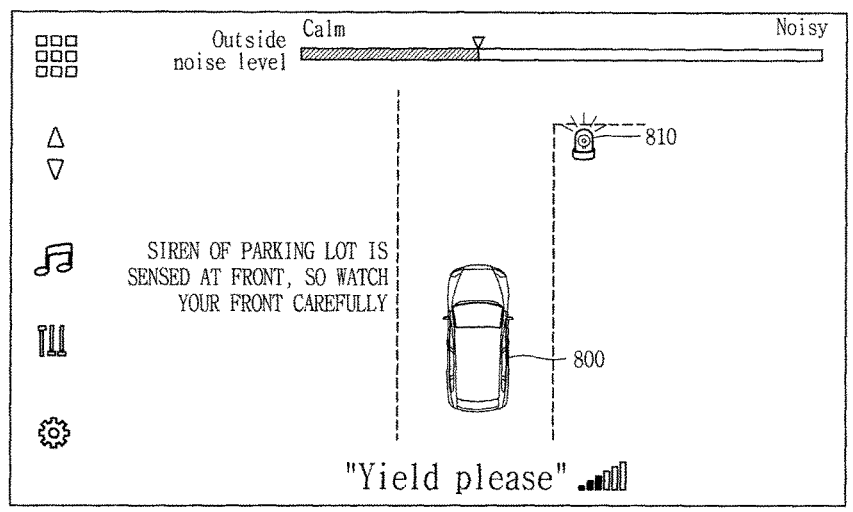

In the above, the method of displaying sound information on the display unit, based on sound information corresponding to a sound generated around the vehicle, has been described. Hereinafter, a method of providing driving guidance information, based on sound information corresponding to a sound generated around the vehicle will be described. FIGS. 8A and 8B are conceptual diagrams illustrating a method of providing driving guidance information, based on sound information corresponding to a sound generated around the vehicle.

The controller 180 in the vehicle control device according to an embodiment of the present disclosure can detect situation information, based on sound information corresponding to a sound generated around the vehicle. Also, the controller 180 can output driving guidance information, based on the situation information. In this instance, the controller 180 can output the driving guidance information as a voice, or may display the driving guidance information on the display unit 151.

For example, as shown in FIG. 8A, the controller 180 can detect situation information representing that an ambulance is approaching, based on sound information corresponding to a siren sound of the ambulance. In this instance, the controller 180 can output driving guidance information instructing the vehicle to move to the right side of a road so as to provide an advancing path of the ambulance, based on the situation information representing that the ambulance is approaching.

The controller 180 can display the driving guidance information on the display unit 151. For example, as shown in FIG. 8A, the controller 180 can display driving guidance information including text information called "An ambulance is approaching to the left side, so move your vehicle to the right side" and a graphic object 800 representing a moving direction of the vehicle, and a graphic object 810 visually representing siren information of the ambulance. If sound information corresponding to the siren sound of the ambulance is sensed, the controller 180 can photograph an image of the ambulance through the camera. Then, the controller 180 can display the photographed image of the ambulance on the display unit 151.

The controller 180 can detect situation information representing that a parking lot exists around the vehicle, based on sound information corresponding to a siren sound of the parking lot. Also, the controller 180 can detect location information of the parking lot, based on the sound information. In this instance, as shown in FIG. 8B, the display 180 may display, on the display unit 151, text information called "A siren of a parking lot is sensed at the front, so watch your front carefully" as the driving guidance information. Also, the controller 180 can display, on the display unit 151, a graphic object 810 representing a parking lot in an area corresponding to the location of the parking lot.

Figure 9:
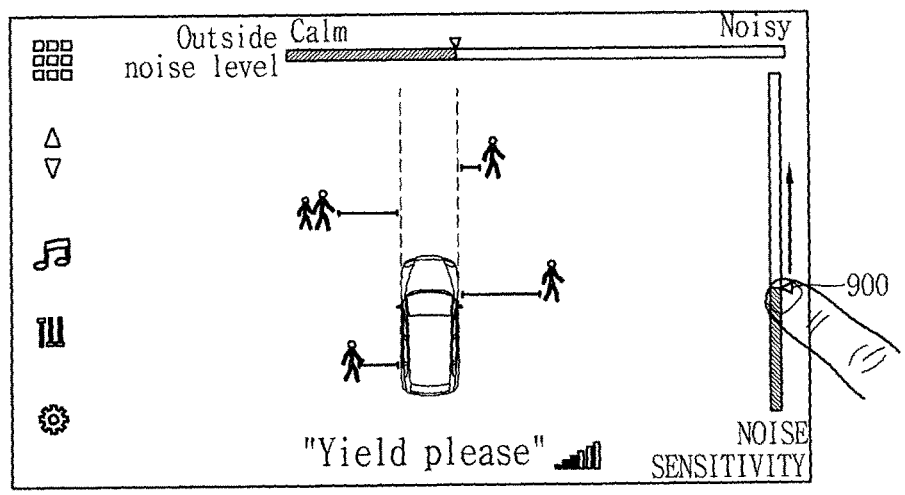
FIG. 9 is a concept diagram illustrating a method of controlling noise sensitivity, based on sound information corresponding to a sound generated around the vehicle.
Figure 9:
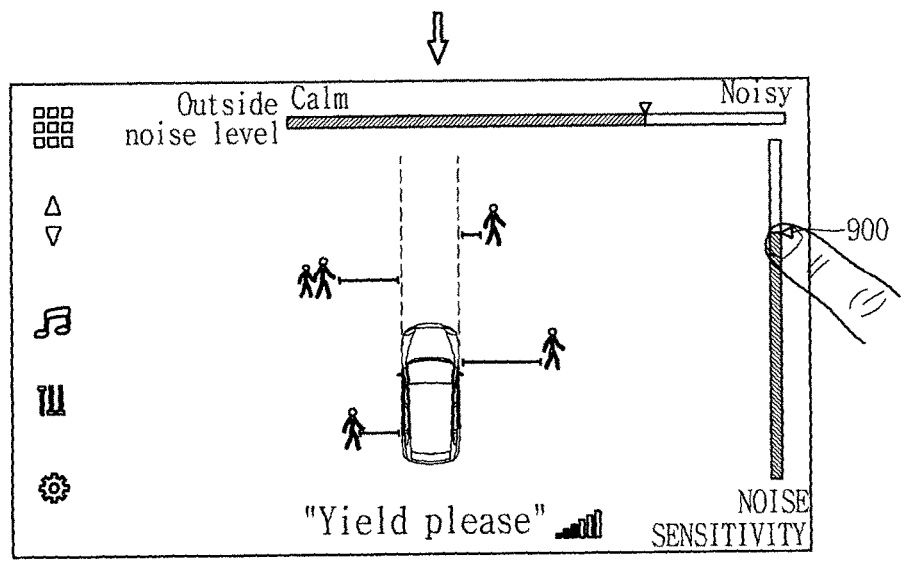

In the above, the method of providing driving guidance information, based on sound information, has been described. Thus, the vehicle control device according to an embodiment of the present disclosure can provide driving guidance information, based on sound information corresponding to a sound generated around the vehicle. Hereinafter, a method of controlling noise sensitivity, based on sound information corresponding to a sound generated around the vehicle will be described. FIG. 9 is a concept diagram illustrating a method of controlling noise sensitivity, based on sound information corresponding to a sound generated around the vehicle.

The controller 180 in the vehicle control device according to an embodiment of the present disclosure can sense a sound generated around the vehicle (inside or outside the vehicle), and determine situation information, based on sound information corresponding to the sensed sound. If it is determined that many obstacles exist around the vehicle, based on the sound information, the controller 180 can sense situation information representing a situation dangerous in driving of the vehicle. In this instance, the controller 180 can increase a noise sensitivity, based on the situation information representing the situation dangerous in the driving of the vehicle. The obstacles may be a subject, an intersection, a building, and the like, which move around the vehicle. The noise sensitivity may refer to a sensitivity in sensing an external sound.

For example, when it is determined that many moving subjects exist around the vehicle, the controller 180 can increase the noise sensitivity. Thus, the vehicle control device according to an embodiment of the present disclosure increases the noise sensitivity so as to improve the driving stability of the vehicle, thereby more sensitively sensing obstacles around the vehicle. Alternatively, the controller 180 can change the noise sensitivity, based on a user's control command. More specifically, the controller 180 can display, on the display unit 151, a bar-shaped graphic object related to a function of controlling the noise sensitivity.

The bar-shaped graphic object may further include a graphic object 900 displaying a current noise sensitivity value. The controller 180 can control the noise sensitivity, based on a predetermined touch input applied to the bar-shaped graphic object. For example, as shown in FIG. 9, the controller 180 can change the current noise sensitivity value, based on a touch input applied the graphic object 900 displaying the noise sensitivity value. The touch input may be a drag touch input.

More specifically, the controller 180 can change the noise sensitivity value into a noise sensitivity value corresponding to an area in which the sensing of a touch input applied to the graphic object 900 is finished. For example, as shown in FIG. 9, the controller 180 can change the noise sensitivity value into a second value greater than a first value, based on a touch input applied to the graphic object 900 in a state in which the current noise sensitivity value is set as the first value.

In the above, the method of controlling the noise sensitivity, based on sound information corresponding to a sound generated around the vehicle, has been described. Hereinafter, a method of recommending or automatically performing a multimedia function, based on sound information, will be described. FIGS. 10A to 11B are conceptual diagrams illustrating a method of recommending or performing a multimedia function, based on sound information.

The controller in the vehicle control device according to an embodiment of the present disclosure can recommend or perform a multimedia function, based on sound information corresponding to a sound generated inside or outside the vehicle. The multimedia function is a function for assisting the driving of the vehicle. The multimedia function may include a function of reproducing music, a function of providing weather, and the like.

The controller 180 may not detect any sound generated inside or outside of the vehicle for a predetermined time or more. In this instance, the controller 180 can output a white noise, offset a low frequency, or output guide information for recommending a multimedia function. Here, the white nose is a sound for preventing driver's drowsiness, lowering of driver's concentration, driver's sickness, and driver's stress. The white noise may be jazz a music, a sound of rain, a sound of a coffee cup, etc. Also, the method of offsetting the low frequency may include various methods which were conventionally used. A method using a sound-absorbing material or a method of generating additional noise may be used as the method of offsetting the low frequency.

Figure 10A:
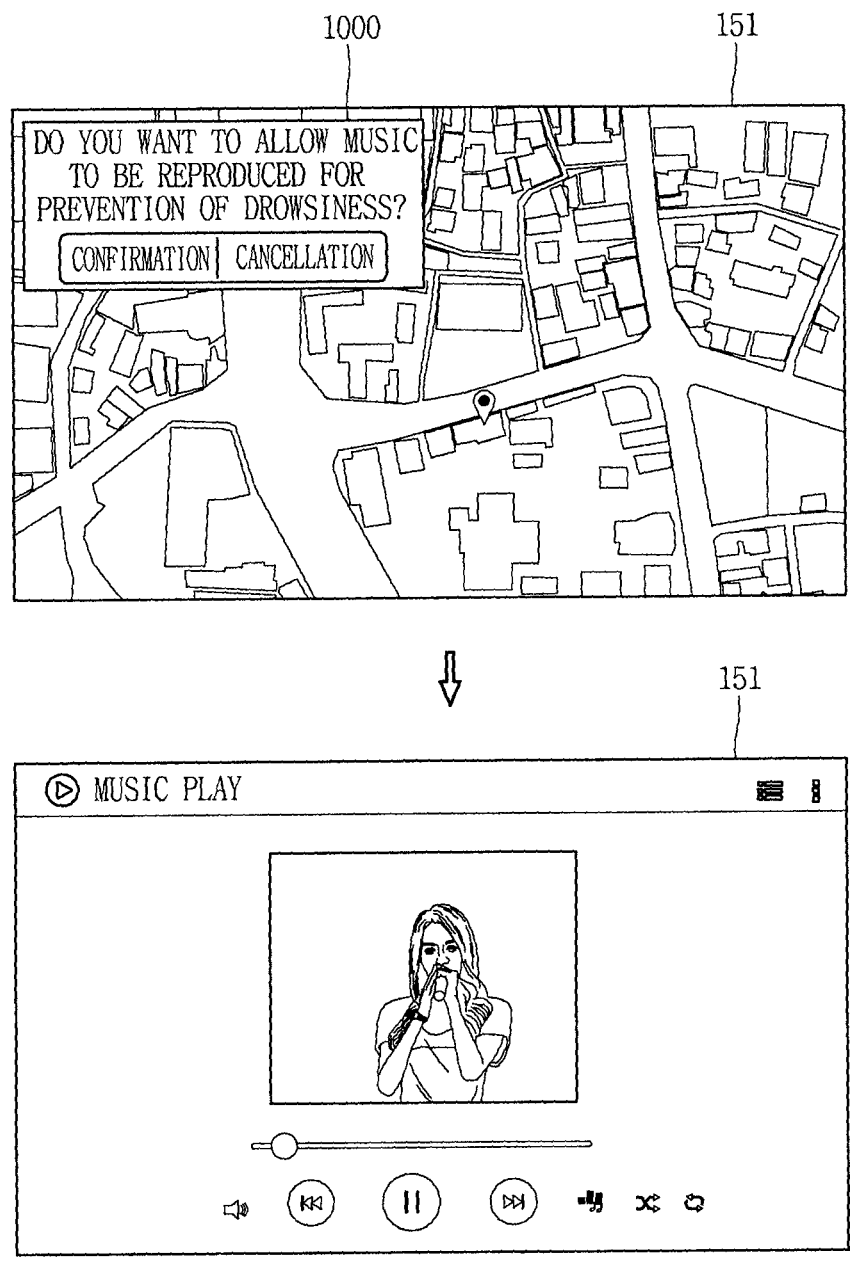
FIGS. 10A to 11B are conceptual diagrams illustrating a method of recommending or performing a multimedia function, based on sound information.

In this instance, the controller 180 can reproduce music in response to a touch input applied to guidance information. For example, as shown in FIG. 10A, the controller 180 can reproduce music in response to a touch input applied to a graphic object related to a confirmation function. Alternatively, the controller 180 can not perform a function of reproducing music in response to a touch input applied to a graphic object related to a cancellation function.

Figure 10B:
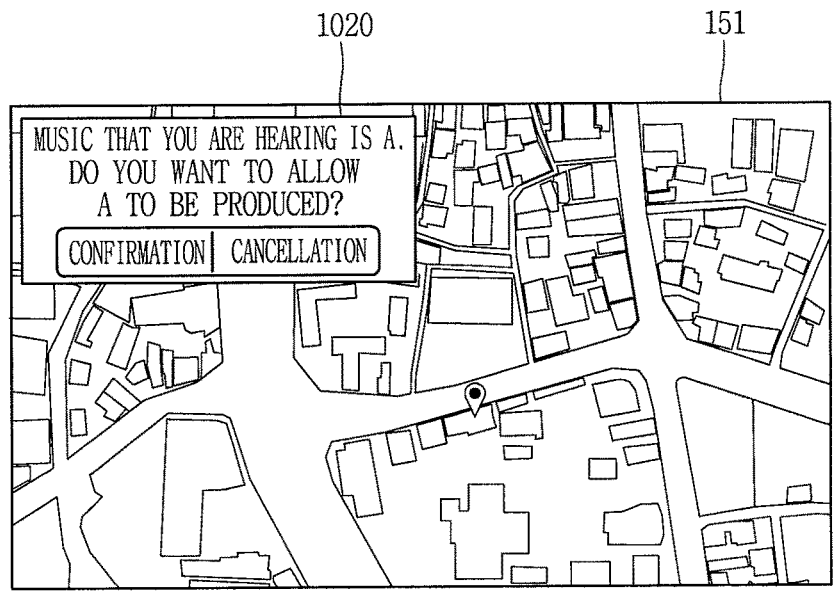

When the sound information corresponding to the sound generated outside the vehicle is music information, the controller 180 can detect information related to the music information. For example, the controller 180 can detect a music title, a music file, singer information, album information, etc. The controller 180 can display information related to the music information on the display unit 151. Also, as shown in FIG. 10B, the controller 180 can output guidance information 1020 for reproducing the music. Thus, the user can easily recognize information on music coming into hearing from the outside. Meanwhile, the guidance information may be output as a voice.

The controller 180 can perform a function of providing weather information, based on sound information corresponding to a sound related to weather, which is generated outside the vehicle. The sound related to the weather may be a sound of thunder beyond the audio frequency, a frictional sound between a wheel and a road surface, or the like. For example, in the case of a rainy day, a frictional sound different from that between a wheel and a road surface on a sunny day may be sensed due to rainwater of the road surface.

In this instance, the controller 180 can output notification information for notifying warning for sound information corresponding to the sound related to the weather, or may provide weather information by being connected to a web page. As an example, in the case of a rainy day, the controller 180 can output, through the sound output unit, notification information for notifying that the user is to be careful of slipperiness of a road surface.

Figure 11A:
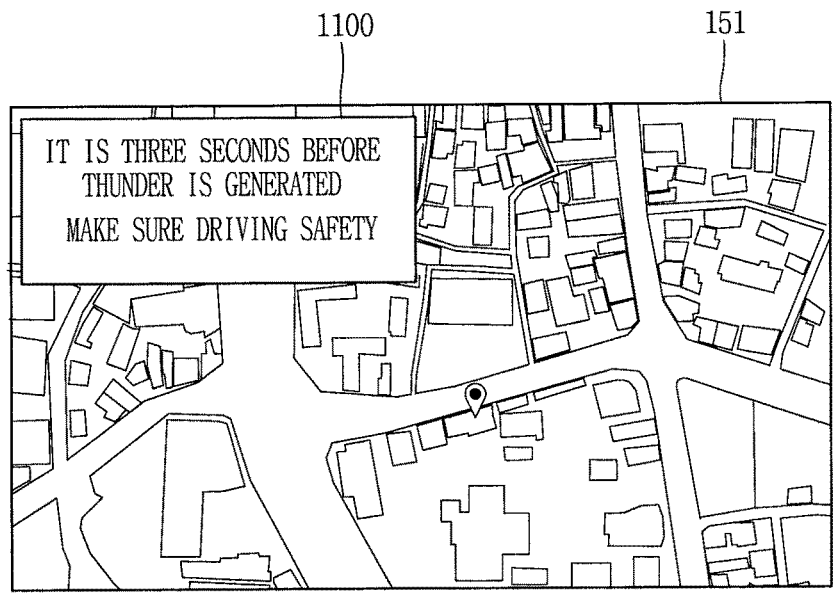

As another example, as shown in FIG. 11A, if a sound of thunder is sensed, the controller 180 can output notification information 1100 called "It is three seconds before a thunder is generated, so make sure driving safety". Thus, the user can previously predict the sound of thunder, and make sure driving safety. Meanwhile, the guidance information may be output as a voice.

Figure 11B:
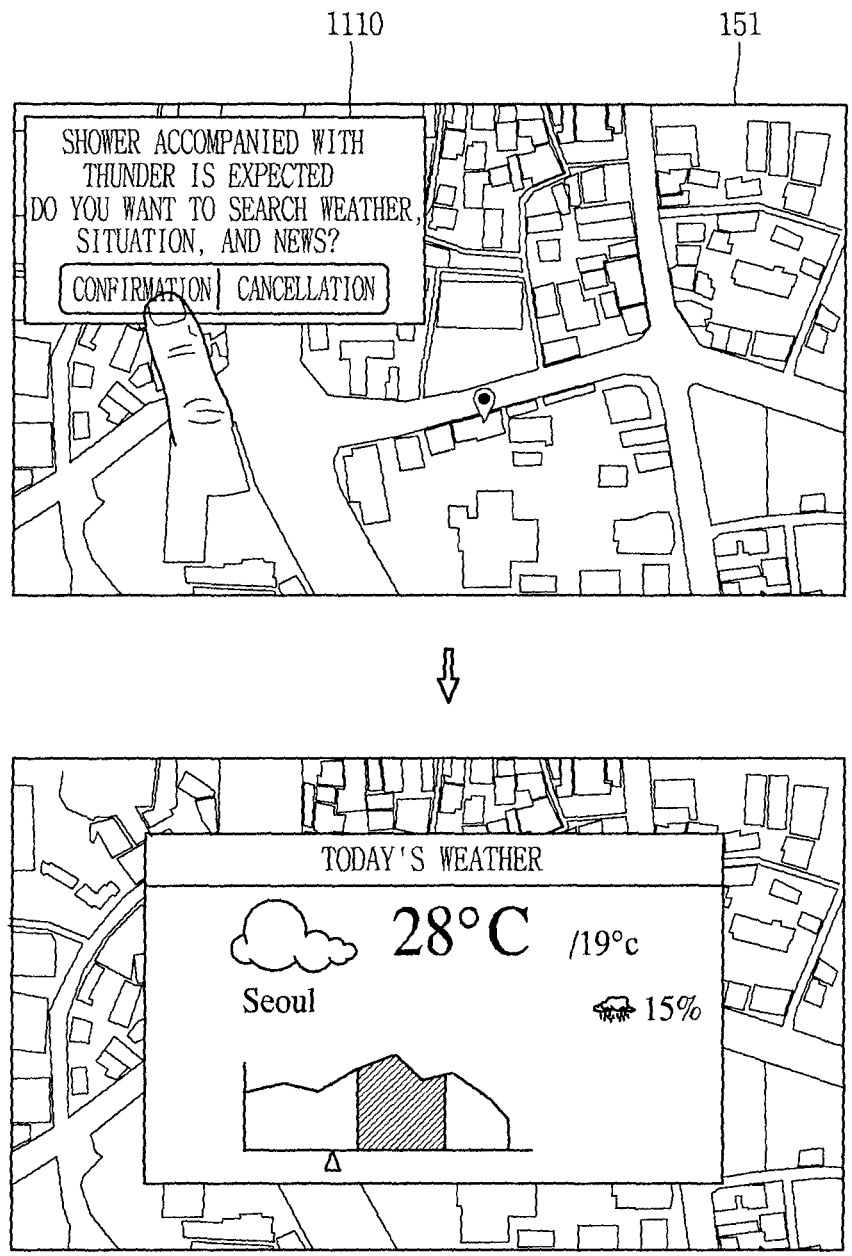

As still another example, as shown in FIG. 11B, the controller 180 can output guide information 1110 for performing a function of searching weather information. In this instance, the controller 180 can perform the function of searching weather information, based on a control command for searching weather information, received from the user. The controller 180 can display the searched weather information on the display unit 151.

The controller 180 can detect road surface state information, based on a frictional sound of a road surface. When the road surface state information corresponds to predetermined information, the controller 180 can output notification information for notifying the road surface state information.

The notification information may be information representing a state of the road surface or driving guidance information related to the state of the road. For example, when it is determined that the state of the road surface is a slippery state, the controller 180 can output notification information called "The road surface is slippery, so make sure driving safety" or "The road surface is slippery, so speed down to 80 km or less."

In the above, the method of performing the multimedia function, based on sound information, has been described. Accordingly, the vehicle control device according to an embodiment of the present disclosure can provide a sensitive service to the user by using sound information corresponding to a sound generated inside or outside of the vehicle. Hereinafter, a method of determining a state of the vehicle, based on sound information corresponding to a sound generated around the vehicle will be described.

The controller 180 in the vehicle control device according to an embodiment of the present disclosure can determine a state of the vehicle, based on information on a sound generated from a component of the vehicle or a frictional sound between a wheel and a road surface. More specifically, the controller 180 can detect an abrasion degree of the wheel, based on the information on the frictional sound between the wheel and the road surface. Also, the controller 180 can detect whether an engine and a brake are normal, based on information on noise generated from the engine and information on noise generated from the brake.

When it is determined that the state of the vehicle is not a normal state but a state (abnormal state), the controller 180 can output notification information such that the user recognizes the abnormal state of the vehicle. The notification information may be output in any one of visual, auditory, and haptic manners. For example, when it is determined that the state of the engine is an abnormal state, the controller 180 can output, as a voice, notification information representing that a problem has occurred in the engine ("A problem has occurred in the engine").

An advanced driver assistance system (ADAS) is used as the system for sensing, in real time, the state of the vehicle as described above. In this instance, the vehicle control device according to an embodiment of the present disclosure can provide sound information to the ADAS, thereby sensing state information of the vehicle. Alternatively, the vehicle control device according to an embodiment of the present disclosure can detect state information of the vehicle, based on sound information, independently from the ADAS.

According to an embodiment of the present disclosure, it is possible to detect situation information, based on sound information corresponding to a sound generated inside or outside the vehicle. Accordingly, the user can quickly sense situation information to be sensed through a sound, and perform a function related to the situation information. Also, according to an embodiment of the present disclosure, it is possible to provide information related to a sound, thereby providing user's convenience. Also, according to an embodiment of the present disclosure, it is possible to provide a method in which a driver inside the vehicle has a conversation with a pedestrian outside the vehicle without opening a window.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device, comprising:
a camera configured to photograph an image around a vehicle;
a display unit configured to display the image received from the camera;
at least one sound sensor arranged on the vehicle and configured to sense a sound generated inside or outside the vehicle;
at least one sound output unit arranged on the vehicle and configured to output sound inside or outside the vehicle;
an eye sensing unit configured to sense a user's viewing angle; and
a controller configured to control at least one of the sound sensor, sound output unit and the display unit to output information based on the sensed sound generated inside or outside the vehicle,
wherein the controller is further configured to:
control the camera to capture an image of a sound generating source based on a location of the sound generating source generating the sound in response to a predetermined condition being satisfied,
display the image received from the camera on the display unit when the sound generating source is located out of the user's viewing angle, and
not display the image received from the camera on the display unit when the sound generating source is located in the user's viewing angle.

2. The vehicle control device of claim 1, wherein the controller is further configured to:
detect the location of the sound generating source generating the sound, and
control the sound output unit to output notification information towards the sound generating source, based on the detected location of the sound generating source.

3. The vehicle control device of claim 2, wherein the controller is further configured to control the sound sensor and the sound output unit such that a sound generated inside the vehicle is output toward the sound generating source located outside the vehicle.

4. The vehicle control device of claim 2, wherein, in response to the detected location of the sound generating source being within a predetermined distance from the vehicle, the controller is further configured to control the sound output unit to output the notification information toward the sound generating source.

5. The vehicle control device of claim 2, wherein, in response to the detected location of the sound generating source not being within the predetermined distance from the vehicle, the controller is further configured to control the sound output unit not to output the notification information is not output toward the sound generating source.

6. The vehicle control device of claim 1, wherein the at least one sound output unit includes a plurality of sound output units arranged to be spaced apart from each other, and
wherein the controller is further configured to control a sound output unit among the plurality of sound output units disposed at a location corresponding to the location of the sound generating source to output notification information related to the sensed sound generated inside or outside the vehicle.

7. The vehicle control device of claim 1, wherein the controller is further configured to detect an accident risk degree and relative distance information related to at least one graphic object included in the image, based on sound information respectively corresponding to sound received from a sound generating source indicating by the at least one graphic object.

8. The vehicle control device of claim 7, wherein the controller is further configured to simultaneously display the accident risk degree and relative distance information related to the at least one graphic object on an area around the area in which the at least one graphic object is displayed.

9. The vehicle control device of claim 7, wherein the controller is further configured to:
receive a touch input applied to a first graphic object among the at least one graphic object, and
control the sound output unit to output notification information toward a sound generating source corresponding to the first graphic object.

10. The vehicle control device of claim 1, wherein the controller is further configured to:
sense an opening/closing state of a window mounted in the vehicle, and
in response to a change from the closing state of the window to the opening state of the window being sensed when the sound output unit and the sound sensor are activated, change the state of the activated sound output unit and the activated sound sensor to a non-activation state.

11. The vehicle control device of claim 1, wherein the controller is further configured to:
  sense a situation information of the vehicle based on the sensed sound generated inside or outside of the vehicle; and
  display information related to the situation information on the display unit such that a driver recognizes the situation information.

12. The vehicle control device of claim 11, wherein the situation information includes at least one of component state information of the vehicle, level information of a noise outside the vehicle, type information of a sound generating source, obstacle information, and state information of a road surface.

13. The vehicle control device of claim 12, wherein, in response to any sound sensed by the sound sensor not being sensed for a predetermined time, the controller is further configured to control the sound output unit to perform a function of reproducing a music or generate a white noise.

14. The vehicle control device of claim 12, wherein, in response to the sound information corresponding to predetermined sound information, the controller is further configured to display driving guidance information related to driving of the vehicle on the display unit.

15. The vehicle control device of claim 1, wherein, the controller is further configured to:
  detect an obstacle exists around the vehicle, and
  control a sound sensitivity of the sound sensor.

16. A method of controlling a vehicle control device, the method comprising:
  capturing, via a camera arranged on a vehicle, an image around a vehicle;
  displaying, via a display unit, the image received from the camera;
  capturing, via a camera arranged on a vehicle, an image around a vehicle;
  displaying, via a display unit, the image received from the camera;
  sensing, via at least one sound sensor arranged on the vehicle, a sound generated inside or outside the vehicle;
  outputting, via at least one sound output unit arranged on the vehicle, sound inside or outside the vehicle;
  sensing, via an eye sensing unit, a user's viewing angle; and
  controlling, via the controller, at least one of the sound sensor, sound output unit and the display unit to output information based on the sensed sound generated inside or outside the vehicle,
  wherein the control method further comprises:
  in response to a predetermined condition being satisfied, controlling the camera to capture an image of the sound generating source based on the location of the sound generating source generating the sound;
  displaying the image received from the camera on the display unit when the sound generating source is located out of the user's viewing angle; and
  not displaying the image received from the camera on the display unit when the sound generating source is located in the user's viewing angle.

17. The method of claim 16, further comprising:
  detecting a location of a sound generating source generating the sound; and
  controlling the sound output unit to output notification information towards the sound generating source, based on the detected location of the sound generating source.

18. The method of claim 17, further comprising:
  controlling the sound sensor and the sound output unit such that the sound generated inside the vehicle is output toward the sound generating source located outside the vehicle.

19. The method of claim 17, wherein, in response to the detected location of the sound generating source being within a predetermined distance from the vehicle, the method further comprises controlling the sound output unit to output the notification information toward the sound generating source.

* * * * *